US010475016B2

(12) United States Patent
Moshal

(10) Patent No.: US 10,475,016 B2
(45) Date of Patent: Nov. 12, 2019

(54) BILL PAYMENT SYSTEM AND METHOD

(71) Applicant: Gelliner Limited, Douglas (GB)

(72) Inventor: Martin Paul Moshal, Queens Way Quay (GI)

(73) Assignee: Gelliner Limited, Douglas (IM)

( * ) Notice: Subject to any disclaimer, the term of this patent is extended or adjusted under 35 U.S.C. 154(b) by 0 days.

(21) Appl. No.: 15/292,273

(22) Filed: Oct. 13, 2016

(65) Prior Publication Data
US 2017/0032350 A1 Feb. 2, 2017

Related U.S. Application Data

(62) Division of application No. 14/356,563, filed as application No. PCT/GB2012/052802 on Nov. 12, 2012, now abandoned.
(Continued)

(30) Foreign Application Priority Data

Nov. 10, 2011 (GB) .................................. 1119375.2

(51) Int. Cl.
*G06Q 20/20* (2012.01)
*G06Q 20/14* (2012.01)
(Continued)

(52) U.S. Cl.
CPC ....... *G06Q 20/208* (2013.01); *G06F 16/9554* (2019.01); *G06K 7/1417* (2013.01);
(Continued)

(58) Field of Classification Search
None
See application file for complete search history.

(56) References Cited

U.S. PATENT DOCUMENTS 6,108,656 A   8/2000  Durst et al.
6,144,959 A  11/2000  Anderson et al.
(Continued)

FOREIGN PATENT DOCUMENTS

CN   1598881 A   3/2005
EP   1195973 A1  4/2002
(Continued)

OTHER PUBLICATIONS

Office Action issued in Japanese Patent Application No. 2014-540554 dated Jan. 4, 2017 (6 pages, plus 9-page English translation).
(Continued)

*Primary Examiner* — Fateh M Obaid
(74) *Attorney, Agent, or Firm* — McDonnell Boehnen Hulbert & Berghoff LLP

(57) ABSTRACT

A system and method to use quick response (QR) codes encoded with a bill from a merchant, such as, for example, provided by a restaurant. A code scanner (106) can scan a QR code that encodes a merchant identification code that identifies a merchant. A user can select a payment instrument on the code scanner for paying the bill. The code scanner can transmit to an application server (102) data pertaining to the payment instrument. The code scanner can receive from the application server status data indicating whether the bill was successfully or unsuccessfully paid.

20 Claims, 12 Drawing Sheets

Related U.S. Application Data

(60) Provisional application No. 61/587,416, filed on Jan. 17, 2012.

(51) Int. Cl.

| | | |
|---|---|---|
| *G06F 16/955* | (2019.01) | |
| *G06Q 20/22* | (2012.01) | |
| *G06Q 20/32* | (2012.01) | |
| *G06Q 20/38* | (2012.01) | |
| *G06Q 20/40* | (2012.01) | |
| *G06Q 20/42* | (2012.01) | |
| *G06Q 30/06* | (2012.01) | |
| *G06Q 30/02* | (2012.01) | |
| *G06Q 20/10* | (2012.01) | |
| *G06Q 20/12* | (2012.01) | |
| *G06K 7/14* | (2006.01) | |
| *G06Q 30/00* | (2012.01) | |
| *H04L 9/08* | (2006.01) | |
| *H04L 29/06* | (2006.01) | |
| *G06K 19/06* | (2006.01) | |

(52) U.S. Cl.
CPC ..... *G06K 19/06037* (2013.01); *G06Q 20/102* (2013.01); *G06Q 20/12* (2013.01); *G06Q 20/14* (2013.01); *G06Q 20/145* (2013.01); *G06Q 20/223* (2013.01); *G06Q 20/322* (2013.01); *G06Q 20/3255* (2013.01); *G06Q 20/3276* (2013.01); *G06Q 20/387* (2013.01); *G06Q 20/3829* (2013.01); *G06Q 20/40* (2013.01); *G06Q 20/4014* (2013.01); *G06Q 20/425* (2013.01); *G06Q 30/0185* (2013.01); *G06Q 30/02* (2013.01); *G06Q 30/0225* (2013.01); *G06Q 30/06* (2013.01); *G06Q 30/0609* (2013.01); *G06Q 30/0633* (2013.01); *H04L 9/0819* (2013.01); *H04L 63/083* (2013.01); *G06Q 2220/10* (2013.01)

(56) References Cited

U.S. PATENT DOCUMENTS

| | | | |
|---|---|---|---|
| 6,151,426 A | 11/2000 | Lee et al. | |
| 6,577,861 B2 | 6/2003 | Ogasawara | |
| 7,080,327 B1 | 7/2006 | Bartz et al. | |
| 7,083,087 B1 | 8/2006 | Gangi | |
| 7,349,884 B1 | 3/2008 | Odom et al. | |
| 7,594,189 B1 | 9/2009 | Walker et al. | |
| 8,424,752 B2 | 4/2013 | Rothschild | |
| 2001/0037297 A1 | 11/2001 | McNair | |
| 2001/0047428 A1 | 11/2001 | Hunter | |
| 2002/0128967 A1* | 9/2002 | Meyer | G06Q 20/04 705/40 |
| 2003/0177090 A1 | 9/2003 | Eden | |
| 2004/0235455 A1 | 11/2004 | Jiang | |
| 2005/0033695 A1 | 2/2005 | Minowa | |
| 2005/0060261 A1 | 3/2005 | Remington et al. | |
| 2005/0096011 A1 | 5/2005 | Yoshida et al. | |
| 2005/0211771 A1 | 9/2005 | Onozu | |
| 2005/0269399 A1 | 12/2005 | Bensimon et al. | |
| 2006/0001897 A1 | 1/2006 | Ogasawara | |
| 2006/0026140 A1 | 2/2006 | King et al. | |
| 2006/0047725 A1 | 3/2006 | Bramson | |
| 2006/0283935 A1 | 12/2006 | Henry et al. | |
| 2007/0174206 A1* | 7/2007 | Colella | G06Q 20/382 705/64 |
| 2007/0299775 A1 | 12/2007 | Algiene | |
| 2007/0300142 A1* | 12/2007 | King | G06Q 30/02 382/181 |
| 2008/0002882 A1 | 1/2008 | Voloshynovskyy et al. | |
| 2008/0040265 A1 | 2/2008 | Rackley, III et al. | |
| 2008/0059372 A1 | 3/2008 | Lee et al. | |
| 2008/0189185 A1 | 8/2008 | Matsuo et al. | |
| 2008/0189208 A1 | 8/2008 | Wilkie | |
| 2008/0222048 A1 | 9/2008 | Higgins et al. | |
| 2008/0301444 A1 | 12/2008 | Kim et al. | |
| 2009/0006254 A1 | 1/2009 | Mumm et al. | |
| 2009/0051665 A1 | 2/2009 | Jang et al. | |
| 2009/0132381 A1 | 5/2009 | Gangi | |
| 2009/0173784 A1* | 7/2009 | Yang | G06Q 20/042 235/380 |
| 2009/0265231 A1 | 10/2009 | Evanitsky | |
| 2009/0307132 A1 | 12/2009 | Phillips | |
| 2009/0319425 A1 | 12/2009 | Tumminaro et al. | |
| 2010/0046811 A1 | 2/2010 | Harris | |
| 2010/0070759 A1 | 3/2010 | Leon Cobos et al. | |
| 2010/0260388 A1 | 10/2010 | Garrett et al. | |
| 2010/0287606 A1 | 11/2010 | Machani | |
| 2010/0320266 A1 | 12/2010 | White | |
| 2011/0089233 A1 | 4/2011 | Locher | |
| 2011/0137742 A1 | 6/2011 | Parikh | |
| 2011/0184843 A1 | 7/2011 | Orttung et al. | |
| 2011/0210922 A1 | 9/2011 | Griffin | |
| 2011/0246070 A1 | 10/2011 | Fitzpatrick et al. | |
| 2011/0251892 A1 | 10/2011 | Laracey | |
| 2011/0251910 A1* | 10/2011 | Dimmick | G06Q 20/12 705/17 |
| 2011/0270751 A1 | 11/2011 | Csinger et al. | |
| 2011/0313893 A1 | 12/2011 | Weik, III | |
| 2012/0029997 A1 | 2/2012 | Khan et al. | |
| 2012/0095791 A1 | 4/2012 | Stefik et al. | |
| 2012/0173387 A1 | 7/2012 | Talker | |
| 2012/0221659 A1 | 8/2012 | Brown et al. | |
| 2012/0234906 A1 | 9/2012 | Ganapathi | |
| 2012/0265585 A1 | 10/2012 | Muirbrook et al. | |
| 2012/0284185 A1 | 11/2012 | Mettler et al. | |
| 2012/0317156 A1 | 12/2012 | Tomita | |
| 2013/0073403 A1 | 3/2013 | Tuchman et al. | |
| 2014/0289107 A1 | 9/2014 | Moshal | |
| 2014/0310117 A1 | 10/2014 | Moshal | |
| 2014/0316991 A1 | 10/2014 | Moshal | |
| 2015/0178757 A1 | 6/2015 | Moshal | |
| 2015/0213527 A1 | 7/2015 | Moshal | |
| 2015/0213528 A1 | 7/2015 | Moshal | |
| 2015/0213529 A1 | 7/2015 | Moshal | |
| 2015/0213530 A1 | 7/2015 | Moshal | |
| 2015/0324777 A1 | 11/2015 | Moshal | |

FOREIGN PATENT DOCUMENTS

| | | |
|---|---|---|
| EP | 1587014 A1 | 10/2005 |
| JP | 61-133455 A | 6/1986 |
| JP | 2001-266055 A | 9/2001 |
| JP | 2001319155 A | 11/2001 |
| JP | 2002-207838 A | 7/2002 |
| JP | 2003-6611 A | 1/2003 |
| JP | 2003-006712 A | 1/2003 |
| JP | 2003141689 A | 5/2003 |
| JP | 2004280626 A | 10/2004 |
| JP | 2005-56333 A | 3/2005 |
| JP | 2005-507585 A | 3/2005 |
| JP | 2005100429 A | 4/2005 |
| JP | 2006-18654 A | 1/2006 |
| JP | 2006-186564 A | 7/2006 |
| JP | 2006-251944 A | 9/2006 |
| JP | 2006-268446 | 10/2006 |
| JP | 2007086915 A | 4/2007 |
| JP | 2007-166123 A | 6/2007 |
| JP | 2007-323613 A | 12/2007 |
| JP | 2007-328695 A | 12/2007 |
| JP | 2007323425 A | 12/2007 |
| JP | 2008129635 A | 6/2008 |
| JP | 2008-257540 A | 10/2008 |
| JP | 2008-305292 A | 12/2008 |
| JP | 2009111871 A | 5/2009 |
| JP | 2009-129097 A | 6/2009 |
| JP | 4305847 B2 | 7/2009 |
| JP | 2009-210678 A | 9/2009 |
| JP | 2010-026608 A | 2/2010 |
| JP | 2010-128736 A | 6/2010 |
| JP | 2010-157153 A | 7/2010 |

(56) References Cited

FOREIGN PATENT DOCUMENTS

| | | | |
|---|---|---|---|
| JP | 2010526368 A | 7/2010 | |
| JP | 2010277580 A | 12/2010 | |
| JP | 2011210171 A | 10/2011 | |
| JP | 2012190308 | 10/2012 | |
| KR | 10-2003-0076815 | 9/2003 | |
| KR | 10-2007-0055069 | 5/2007 | |
| KR | 10-2007-0065958 | 6/2007 | |
| KR | 10-2008-0020153 | 3/2008 | |
| KR | 10-2009-0066516 | 6/2009 | |
| KR | 10-2010-0045586 | 5/2010 | |
| KR | 10-2010-0062255 | 6/2010 | |
| KR | 10-2011-0006732 | 1/2011 | |
| KR | 10-2011-0006734 | 1/2011 | |
| KR | 10-2011-0098247 | 1/2011 | |
| KR | 10-2011-0038358 | 4/2011 | |
| KR | 10-2011-0066841 | 6/2011 | |
| KR | 10-2011-0112142 | 10/2011 | |
| KR | 10-2012-026221 | 3/2012 | |
| KR | 10-2012-0097789 | 9/2012 | |
| WO | 9904326 A2 | 1/1999 | |
| WO | 00/60484 A1 | 10/2000 | |
| WO | 02/080015 A1 | 10/2002 | |
| WO | 03/034265 A1 | 4/2003 | |
| WO | 2005/111950 A1 | 11/2005 | |
| WO | 2007018233 A1 | 2/2007 | |
| WO | 2008136764 A1 | 11/2008 | |
| WO | 2010013296 A1 | 2/2010 | |
| WO | 2011/003467 A1 | 1/2011 | |
| WO | 2011/127354 A2 | 10/2011 | |
| WO | 2013/068719 A1 | 5/2013 | |
| WO | 2013/068765 A1 | 5/2013 | |
| WO | 2013/068767 A1 | 5/2013 | |
| WO | 2013/068768 A1 | 5/2013 | |

OTHER PUBLICATIONS

International Search Report, International Application No. PCT/GB2012/052802, dated Feb. 7, 2013 (4 pages).
Written Opinion of the International Searching Authority, International Application No. PCT/GB2012/052802, dated Feb. 7, 2013 (4 pages).
Communication pursuant to Article 94(3) EPC from the European Patent Office, EP Application No. 12787844.5-1955, dated Jan. 18, 2016 (7 pages).
Jerry Gao et al., A 2D Barcode-Based Mobile Payment System, Third International Conference on Multimedia and Ubiquitous Engineering, IEEE, Piscataway, NJ, Jun. 4, 2009, pp. 320-329 (10 pages).
Jaesik Lee et al., Secure Quick Response-Payment (QR-Pay) System using Mobile Device, 13th International Conference on Advanced Communication Technology (ICACT 2011), IEEE, Feb. 13, 2011, pp. 1424-1427 (4 pages).
Open Mobile Alliance (OMA), White Paper on Mobile Codes, OMA-WP-MobileCodes-20081024-A, Approved Oct. 24, 2008, pp. 1-26.
Office action from Korean Patent Application No. 10-2014-7015588, dated Jun. 21, 2018, 9 pages plus English translation 8 pages.
European Patent Office; Summons to attend oral proceedings pursuant to Rule 115(1)EPC from European Patent Application No. 12787844.5-1217 / 2776996; Jul. 27, 2018.
Guide for purchasing smart phone, Windows for adults, Japan, Inforest Co., Ltd., May 1, 2011, vol. 33, p. 32 (with original office action and English translation of office action citing literature).
Office action issued in Japanese Patent Application No. 2014-540547 dated Oct. 26, 2016 (4 pages, plus 3-page English translation).

* cited by examiner

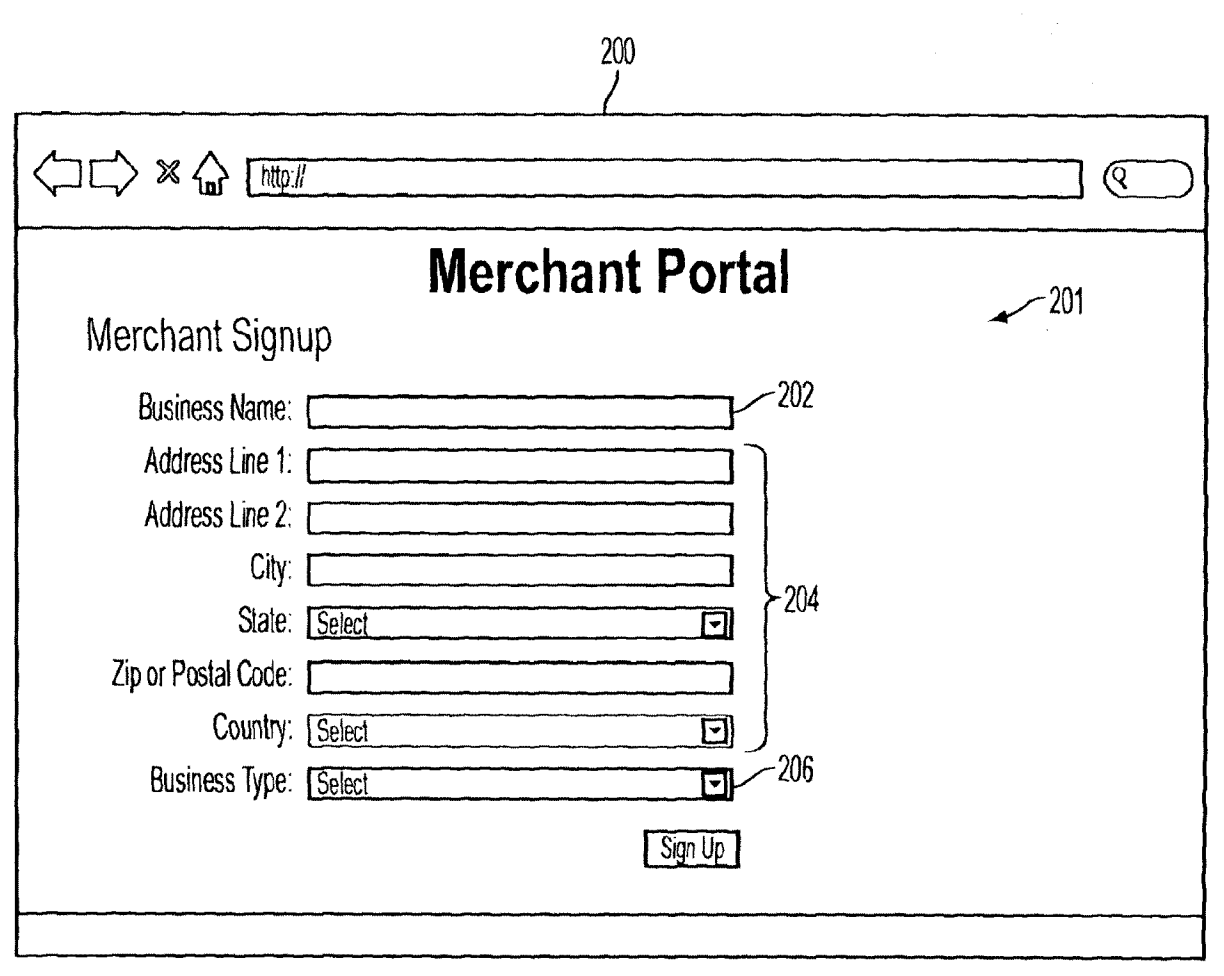

Merchant Portal

Merchant Signup

Business Name: [_____] —202

Address Line 1: [_____]
Address Line 2: [_____]
City: [_____]            } —204
State: [Select ▸]
Zip or Postal Code: [_____]
Country: [Select ▸]
Business Type: [Select ▸] —206

[Sign Up]

FIGURE 2

BILL PAYMENT SYSTEM AND METHOD

PRIORITY CLAIMS

This application claims the benefit of GB Application No 11193712, filed Nov. 10, 2011, and claims the benefit of U.S. Provisional Application No. 61/587,416, filed Jan. 17, 2012. GB Application 1119375.2 and U.S. Provisional Application No. 61/587,416 are incorporated herein by reference for all purposes.

BACKGROUND

Bill payment at establishments such as restaurants, refueling stations and retailers can be tedious and time-consuming. For example, at a restaurant, when a diner is presented with a bill at the conclusion of a meal, the diner can tender cash or a payment instrument (such as a credit or debit card) to a waiter in order to pay the bill. The waiter is then required to provide change if payment is by cash, or to use a point-of-sale ("POS") terminal if a payment instrument is used.

A further illustration of the tediousness of bill payment occurs where a diner elects to add a discretionary gratuity (or "tip") to the bill total as a reward for good service, or elects to deduct or alter an optional gratuity is already reflected in the bill total. Still further, the diner may wish to split the bill total, with or without a gratuity, equally with fellow-diners, or the diners may agree that each person pays for the items on the bill that each person has consumed.

The applicant has appreciated the desirability of a simpler process for paying bills than that described above.

OVERVIEW

Example embodiments are described herein. In one respect, an example embodiment takes the form of a method comprising (i) scanning, using a code scanner, a quick response (QR) code that encodes a merchant identification code that identifies a merchant; (ii) decoding, using the code scanner, the QR code to recover the merchant identification code; (iii) displaying, on the code scanner, information pertaining to a bill from the merchant; (iv) selecting, using the code scanner, a first payment instrument for paying the bill, and authorizing the bill for payment; (v) transmitting from the code scanner to an application server the merchant identification code, data pertaining to an amount due on the bill, and data pertaining to the first payment instrument; and (vi) receiving, at the code scanner from the application server, status data indicating whether the bill was successfully or unsuccessfully paid.

In another respect, an example embodiment takes the form of a code scanner device comprising: (i) a processor; (ii) a scanner configured to scan a quick response (QR) code that encodes a merchant identification code that identifies a merchant; (iii) a non-transitory computer-readable data storage device comprising computer-readable program instructions, wherein the program instructions are executable by the processor to decode the QR code; (iv) a user interface configured to display bill information and to allow a user to select a first payment instrument for paying the bill and to authorize a bill for payment; and (v) a network interface; (vi) wherein the network interface is configured to transmit, to an application server, the merchant identification code, data pertaining to an amount due on the bill, and data pertaining to the first payment instrument; and (vii) wherein the network interface is configured to receive, from the application server, status data indicating whether the initial attempt of paying the bill was successful or unsuccessful.

In yet another respect, an example embodiment takes the form of a method comprising: (i) receiving, at an application server from a first code scanner, a merchant identification code that identifies a merchant; (ii) receiving, at the application server from the first code scanner, data pertaining to an amount due on a bill from the merchant; (iii) receiving, at the application server from the first code scanner, data pertaining to a first payment instrument selected for a first attempt of paying the bill; (iv) determining, at the application server, whether processing the data pertaining to the amount due on the bill and the data pertaining to the first payment instrument results in successful or unsuccessful payment of the bill; and (v) transmitting, from the application server to the first code scanner, first status data indicating whether the attempt of paying the bill was successful or unsuccessful.

In yet another respect, an example embodiment takes the form of an application server system comprising: (i) a processor; (ii) a non-transitory computer-readable data storage device comprising computer-readable program instructions; and (iii) a network interface to receive, from a first code scanner, (1) a merchant identification code that identifies a merchant, (2) data pertaining to an amount due on a bill from the merchant, and (3) data pertaining to a first payment instrument selected for an attempt of paying the bill; and (iv) wherein the program instructions are executable by the processor to determine whether processing the data pertaining to the amount due on the bill and the data pertaining to the first payment instrument results in successful or unsuccessful payment of the bill; (v) wherein the program instructions are executable by the processor to cause the network interface to transmit first status data to the first code scanner; and (vi) wherein the first status data indicates whether the attempt of paying the bill was successful or unsuccessful.

In yet another respect, an example embodiment takes the form of a method comprising: (i) receiving, at a merchant terminal, (1) a bill identification code that identifies a bill from a merchant and (2) data pertaining to details of the bill; and (ii) provisioning a bills database with the bill identification code and data pertaining to details of the bill, and identifying a status of the bill as unpaid.

In yet another respect, an example embodiment takes the form of a merchant terminal device comprising: (i) a processor; (ii) a non-transitory computer-readable data storage device comprising computer-readable program instructions; and (iii) a network interface; (iv) wherein the network interface is configured to receive (1) a bill identification code that identifies a bill from a merchant and (2) data pertaining to details of the bill; and (v) wherein the program instructions are executable by the processor to provision a bills database with the bill identification code and the data pertaining to details of the bill, and an identification of a status of the bill as unpaid.

In yet another respect, an example embodiment takes the form of a method comprising: (i) providing, at a point of sale terminal, a bill from a merchant; and (ii) providing, at the point of sale terminal, a quick response (QR) code that encodes a merchant identification code that identifies the merchant.

In yet another respect, an example embodiment takes the form of a point of sale terminal device comprising: (i) a processor; (ii) a non-transitory computer-readable data storage device comprising computer-readable program instructions; and (iii) a network interface; and (iv) wherein the program instructions are executable by the processor to provide a bill from a merchant and a quick response (QR) code that encodes a merchant identification code that identifies the merchant.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings, in which:

FIG. 2 is a representation of a webpage of a merchant portal website hosted on an application server in the system of FIG. 1;

DETAILED DESCRIPTION

I. Introduction

This description describes, among other things, example embodiments with respect to paying a bill at a merchant establishment. In this description, the articles "a" or "an" are used to introduce elements of the example embodiments. The intent of using those articles is that there is one or more of the elements. The intent of using the conjunction "or" within a described list of at least 2 terms is to indicate that any of the listed terms or any combination of the listed terms. The terms "first" and "second" are used to distinguish respective elements and are not used to denote a particular order of those elements.

The following abbreviations or acronyms are used in the description:

CVC—Card Verification Code;
FIG.—Figure;
FIGs.—Figures;
Inc.—Incorporated;
Merchant App—Merchant Terminal Application Program;
PIN—Personal Identification Number;
QR—Quick Response;
Scanner App—Scanner Application Program; and
URL—Uniform Resource Locator.

II. Example Architecture

Figure 1:
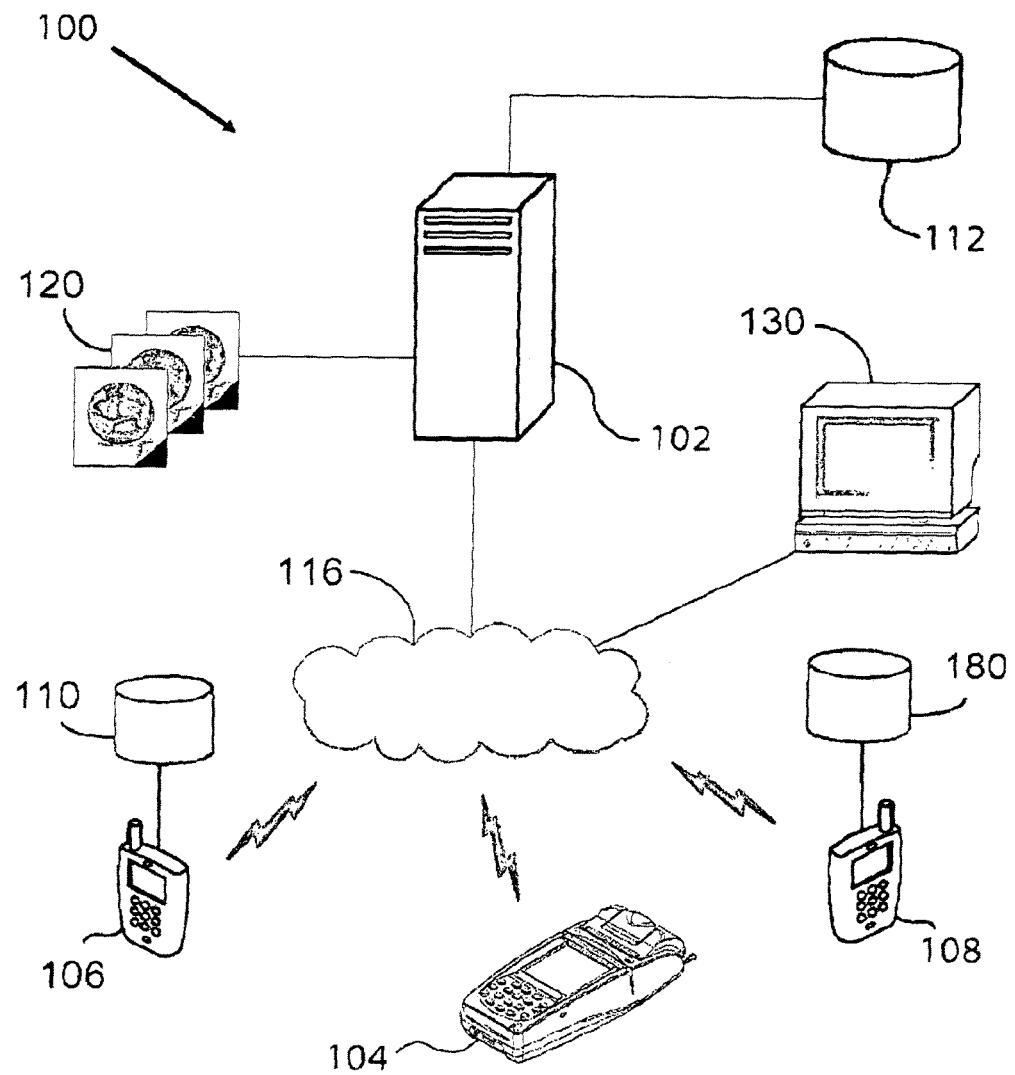
FIG. 1 is a schematic representation of a system for the payment of bills.

FIG. 1 depicts a schematic representation of a system 100 for payment of bills in accordance with example embodiments described herein. The system 100 includes an application server 102, a POS terminal 104, a code scanner 106 device configured to scan and decode Quick Response (QR) codes which are well known and widely used, and a merchant terminal 108. The code scanner 106 can take the form of a conventional smartphone handset provisioned with software for scanning QR codes, a web browser, and a wireless connection to the internet. The code scanner 106 can be referred to as a "mobile wireless communication device," a "mobile smartphone handset" or, more simply, a "mobile smartphone" or "smartphone." As an example, the mobile wireless communication device can be a personal digital assistant or a cellular telephone. As another example, the mobile wireless communication device can be an iPhone, such as the iPhone5, or an iPad sold by Apple Inc., Cupertino, Calif., United States. The code scanner 106 does not need to be a mobile device, but can be a device that remains attached to a stationary internet-enabled device.

The merchant terminal 108 can take the form of a conventional smartphone handset provisioned with a web browser and a wireless connection to the internet. The merchant terminal 108 can be referred to as a "merchant wireless communication device", a "merchant smartphone handset" or, more simply, a "merchant smartphone". As an example, the merchant wireless communication device can be a personal digital assistant or a cellular telephone. The merchant wireless communication device 108 does not need to be a mobile device, but can be a device that remains attached to a stationary internet-enabled device.

The application server 102, the POS terminal 104, the code scanner 106 and the merchant terminal 108 can communicate with each other using a communication network 116. The communication network 116 can comprise a wide-area network, such as the internet.

Communication between the application server 102, the code scanner 106 and the merchant terminal 108 can be facilitated by using a server-hosted program (not shown), a scanner application program (a 'scanner app') that is installed and executed on the code scanner 106, and a merchant application program (a "merchant app") that is installed and executed on the merchant terminal 108. In another respect, communication between the application server 102 and code scanner 106 can occur using network interface 152 (shown in FIG. 4) and network interface 176 (shown in FIG. 6).

A user can download a copy of the scanner app from a download repository (for example, data storage device 178 in FIG. 4) and install the scanner app on the code scanner 106. On, during, or after installation, the scanner app creates a user profile 110 on the code scanner 106 and prompts the user to manually provide personal attributes such as, the user's first name, the user's last name, an e-mail address, a physical address and particulars of one or more payment instruments such as credit cards, debit cards, e-wallets and the like. In accordance with at least some example embodiments, the user profile 110 (for example, the data in the user profile 110) is stored locally on the code scanner 106 and is not passed to the application server 102.

A merchant can download a copy of the merchant app from a download repository (for example, data storage device 178 in FIG. 4) and install the merchant app on the merchant terminal 108. The application server 102 hosts a merchant portal website 120 that enables merchants to register and create individual merchant profiles that are maintained by the application server 102 in a merchant database 112. The merchant portal website 120 can be referred to as a "portal website." Merchant registration and creation of a merchant profile in the merchant database 112 can be performed online by the merchant portal website 120. A merchant can use a merchant computing device 130 including a display for displaying websites to display merchant portal websites and an input device for selecting or entering data onto the merchant portal websites.

FIG. 2 shows an example webpage 200 of the merchant portal website 120. The webpage 200 can display a registration form 201 that a merchant can complete in order to register with the merchant portal website 120. The webpage 200 can be a homepage of the merchant portal website 120. As an example, the registration form 201 can include the following fields: a merchant's business name 202, a merchant's business address 204, and a description of the merchant's business 206. As an example, the business description can be a restaurant, a motor vehicle repair shop, a retail store, or some other business description. Other examples of fields on the registration form 201 are possible. Entering data into the registration form 201 can occur, for example, by typing data or selecting data from a list of predetermined data.

A merchant can, in this manner, configure the merchant for QR-based bill payment. The application server 102 can assign a unique merchant identification code to each merchant business configured in this manner and the merchant identification code is stored in the merchant's profile in the merchant database 112. Additionally or alternatively, each merchant identification code can be provided to and stored with a QR source that serves QR codes to the POS terminal 104. For the sake of being brief, a merchant identification code can be referred to as an "identification code."

In this description the terms 'user' and 'customer' are used interchangeably depending on the context. For example a user of the scanner app on the code scanner 106 can also be a customer of the merchant.

Figure 3:
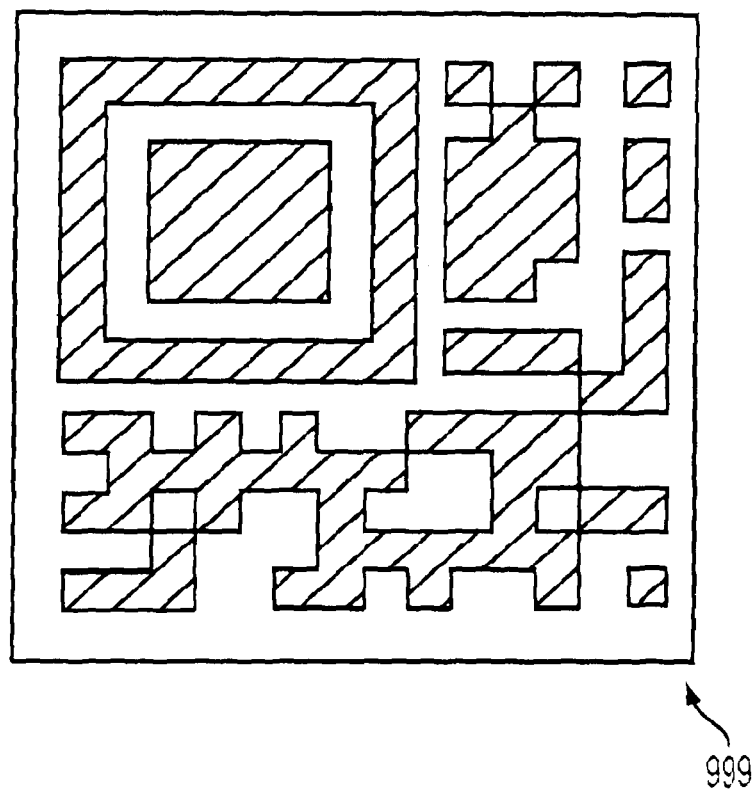
FIG. 3 illustrates an example quick response (QR) code.

FIG. 3 illustrates an example QR code 999. QR code 999 can be encoded as a payment QR code.

Figure 4:
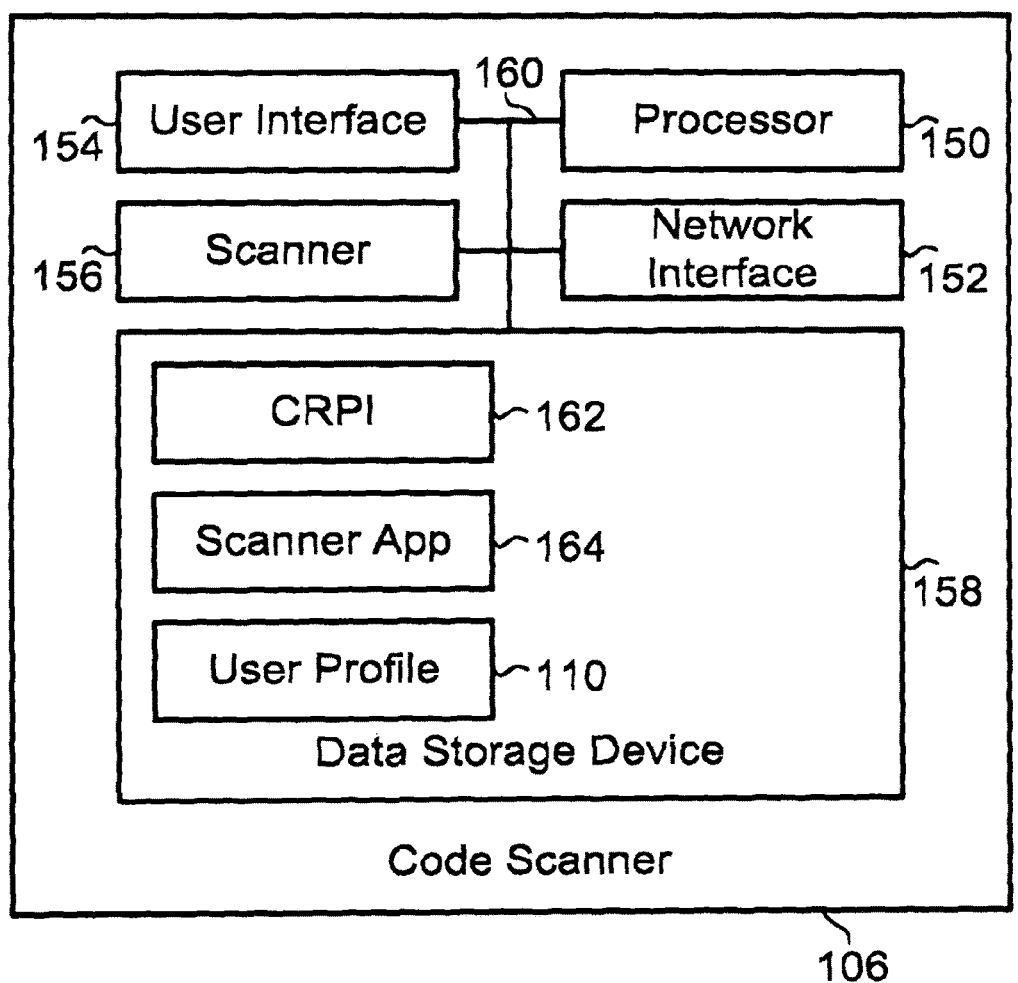
FIG. 4 is a block diagram of a code scanner in accordance with an example embodiment.

Next, FIG. 4 is a block diagram depicting an example embodiment of code scanner 106. As shown in FIG. 4, code scanner 106 includes (i) a processor 150, (ii) a network interface 152 for transmitting data to and receiving data from communication network 116, (iii) a user interface 154, (iv) a scanner 156 configured to scan (for example, capture) QR codes, and (v) a data storage device 158, all of which can be linked together via a system bus or other connection mechanism 160. Data storage device 158 includes computer-readable program instructions (CRPI) 162, the scanner app 164, and a user profile 110. CRPI 162 can include the scanner app 164. Data storage device 158 can comprise a non-transitory computer-readable storage medium readable by processor 150. Each computer-readable storage medium described herein can comprise volatile and/or non-volatile storage components, such as optical, magnetic, organic or other memory or disc storage, which can be integrated in whole or in part with a processor.

Each processor described herein can comprise one or more general purpose processors (for example, INTEL single core microprocessors or INTEL multicore microprocessors) or one or more special purpose processors (for example, digital signal processors). Processor 150 is configured to execute CRPI 162.

Figure 5:
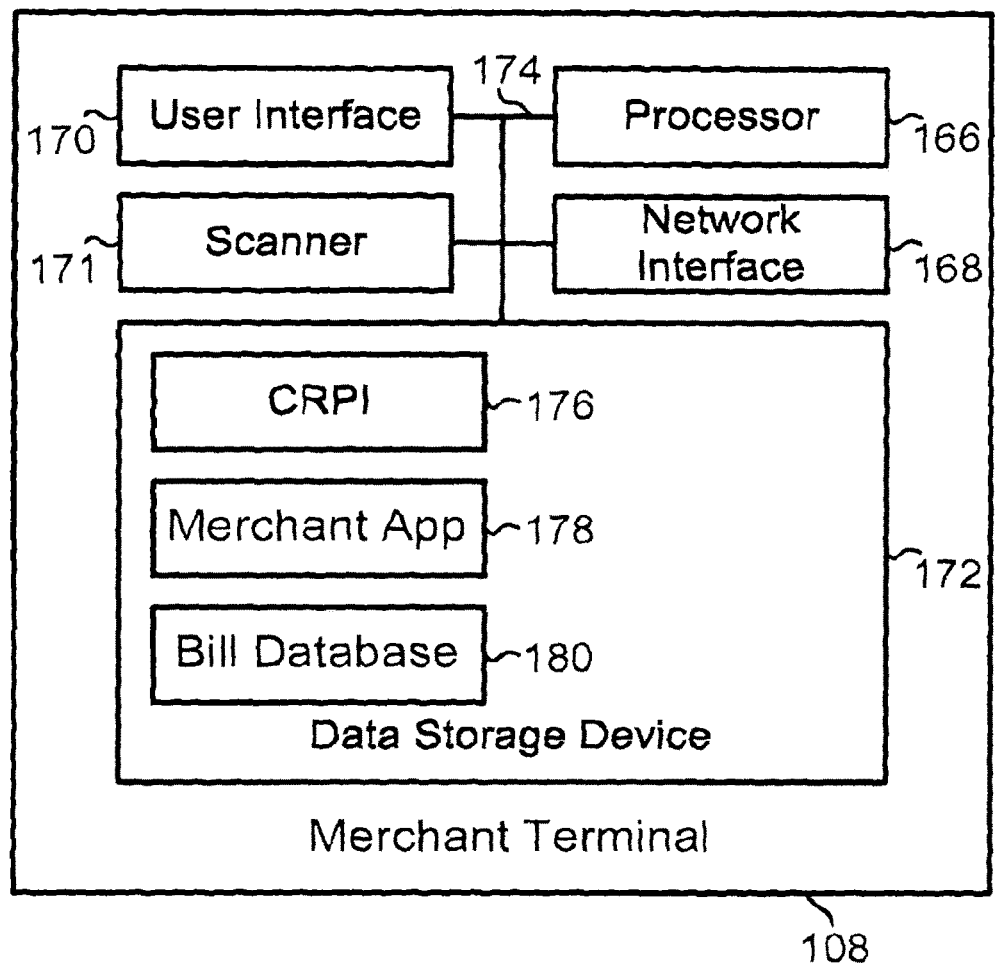
FIG. 5 is a block diagram of a merchant terminal in accordance with an example embodiment.

FIG. 5 is a block diagram depicting an example embodiment of merchant terminal 108. As shown in FIG. 5, merchant terminal 108 includes (i) a processor 166, (ii) a network interface 168 for transmitting data to and receiving data from communication network 116, (iii) a user interface 170, (iv) a scanner 171 configured to scan (for example, capture) QR codes and (v) a data storage device 172, all of which can be linked together via a system bus or other connection mechanism 174. Data storage device 172 includes computer-readable program instructions (CRPI) 176, the merchant app 178, and a bill database 180. CRPI 176 can include the merchant app 178. Data storage device 172 can comprise a non-transitory computer-readable storage medium readable by processor 166. Processor 166 is configured to execute CRPI 176.

Figure 6:
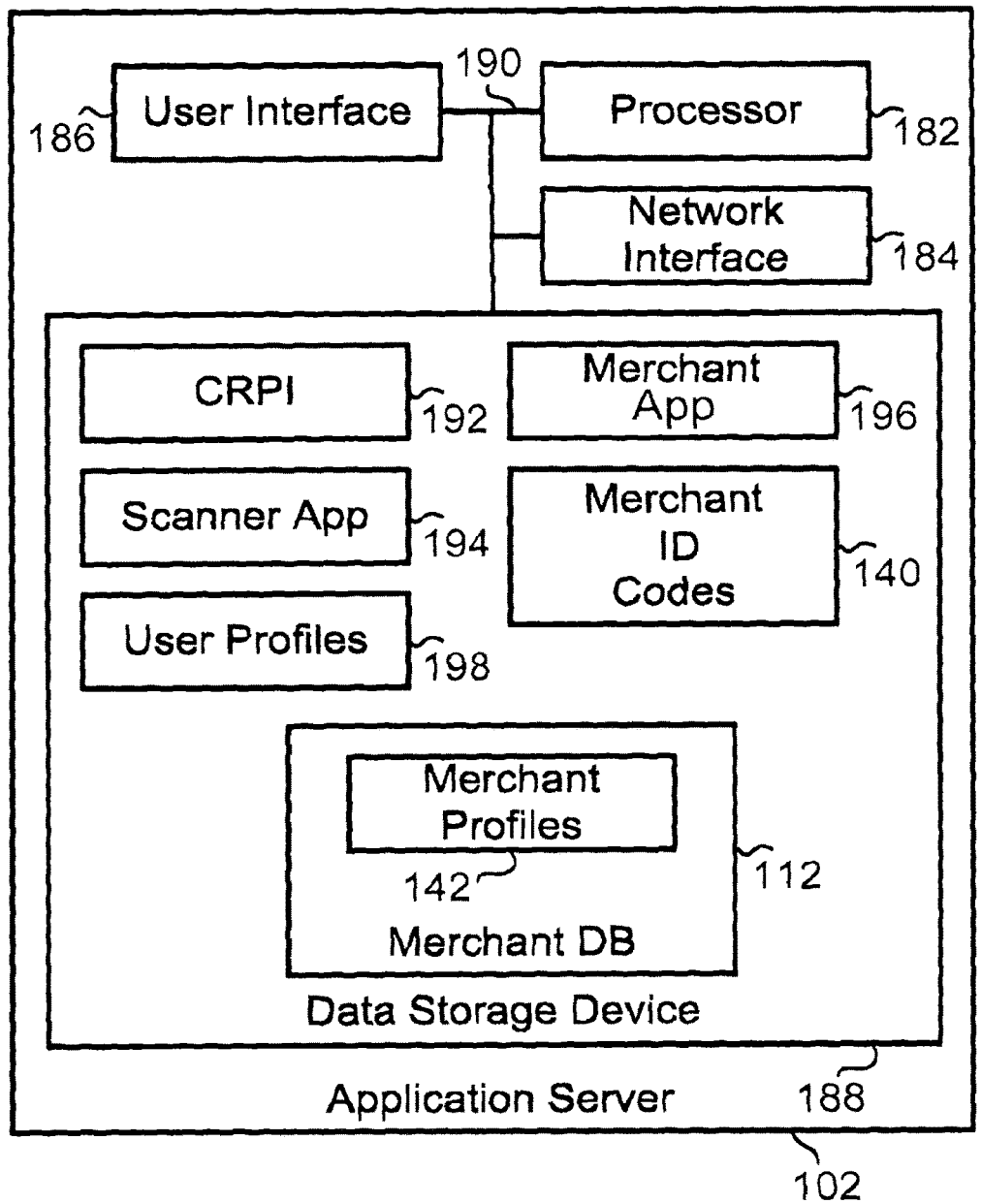
FIG. 6 is a block diagram of an application server in accordance with an example embodiment.

Next, FIG. 6 is a block diagram depicting an example embodiment of application server 102. As shown in FIG. 6, application server 102 can include (i) a processor 182, (ii) a network interface 184 for transmitting data to and receiving data from communication network 116, (iii) a user interface 186, and (iv) a data storage device 188, all of which can be linked together via a system bus or other connection mechanism 190. Data storage device 188 can include (i) CRPI 192, (ii) the scanner app 194 for downloading to code scanners, (iii) the merchant app 196 for downloading to merchant terminals, (iv) user profiles 198, (v) merchant website identification codes 140 for merchant businesses, and (vi) merchant database 112 including merchant profiles 142. CRPI 192 can include the scanner app 194 and merchant app 196. Data storage device 188 can comprise a non-transitory computer-readable storage medium readable by processor 182. Processor 182 is configured to execute CRPI 192.

III. Example Operation A

The system 100 can be used to register and pay a bill at a merchant business by use of the code scanner 106. The following example describes an application of the system 100 by a user (a diner) at a restaurant who wishes to pay a restaurant bill after completion of a meal. In addition to this particular example, the system 100 is also applicable to payment of other types of bills such as, for example, utility bills, traffic fines, online shopping bills and the like. The merchant (restaurant proprietor or manager) will have already downloaded the merchant app 196 from the application server 102, installed the merchant app on the merchant terminal 108, registered on the portal website 120 and created a merchant profile 142 in the merchant database 112. The merchant profile 142 includes a merchant identification code 140 assigned by the application sewer 102.

Figure 7:
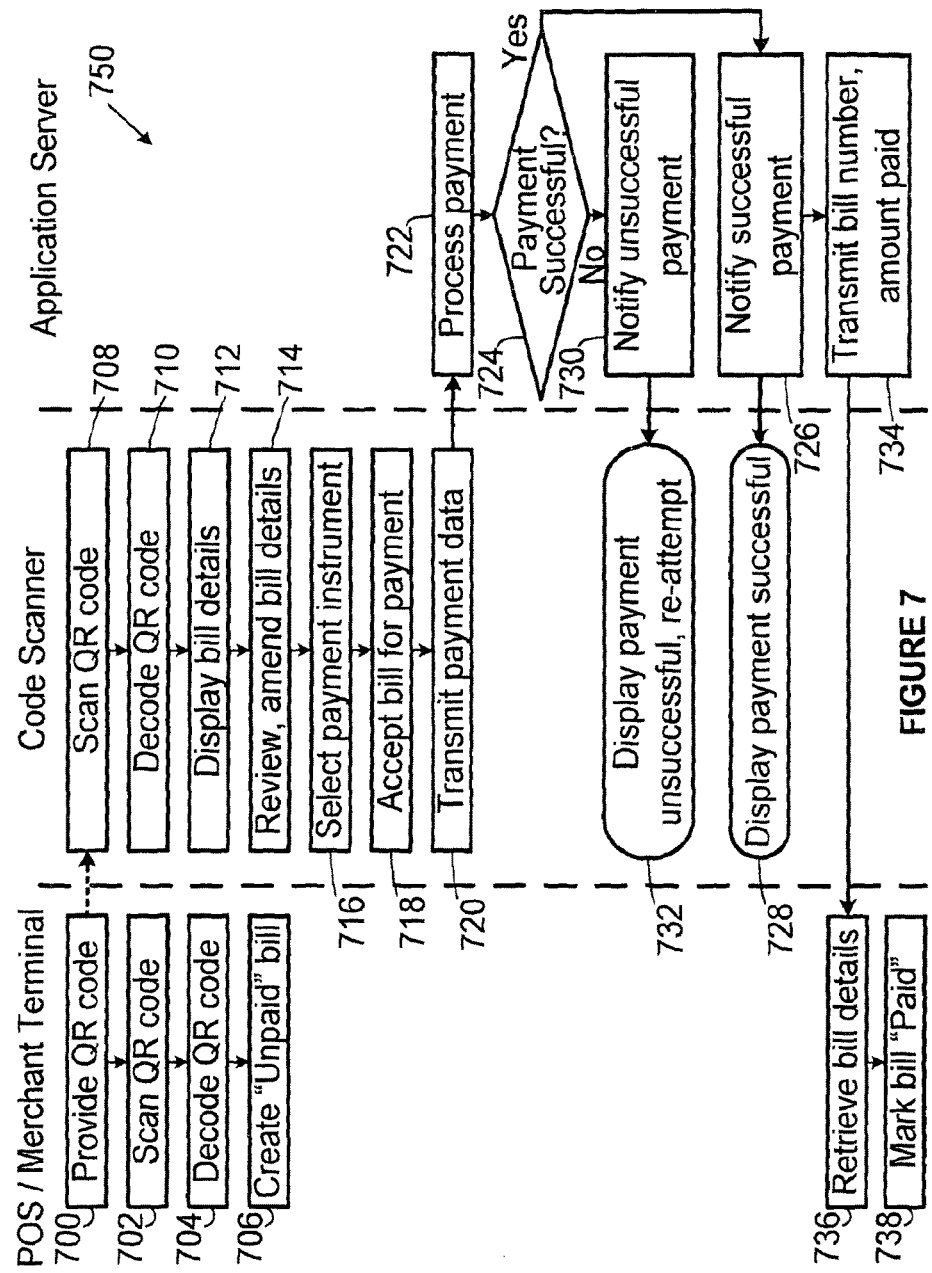
FIG. 7 is a flow chart of functions to carry out payment of a bill at a merchant establishment in accordance with the first embodiment of the system of FIG. 1.

FIG. 7 is a flow chart depicting a set of functions 750 that can be carried out in accordance with an example embodiment. The set of functions 750 can be performed to pay the restaurant bill. The set of functions 750 are shown within blocks 700 through 738. A description of those blocks now follows.

Upon completion of the meal the diner can request a bill for payment from a waiter. The waiter can draw up a bill that contains, for example, a name and address of the restaurant, a waiter identification, a table number, a description and a corresponding cost of each item consumed during the meal, any tax such as sales tax or value-added tax included in the bill, and a total amount due. At block 700 the POS terminal 104 can provide a payment QR code that encodes the merchant identification code 140 in the merchant profile 142, a bill identification code or number, and all the details contained in the bill. The payment QR code may be generated by the POS terminal 104 or may be served to the POS terminal by an external source of QR codes (not shown). At block 702 the waiter or merchant can use the merchant app 178 and the scanner 171 on the merchant terminal 108 to scan the payment QR code provided by the POS terminal 104. At block 704, the merchant app 178 decodes the scanned payment QR code to recover the encoded data that it contains, in particular the bill identification number and the bill details. At block 706, the merchant app 178 appends the bill identification number and the bill details to the bills database 180 on the merchant terminal 108 and marks the status of the bill as pending (or unpaid).

Figure 8:
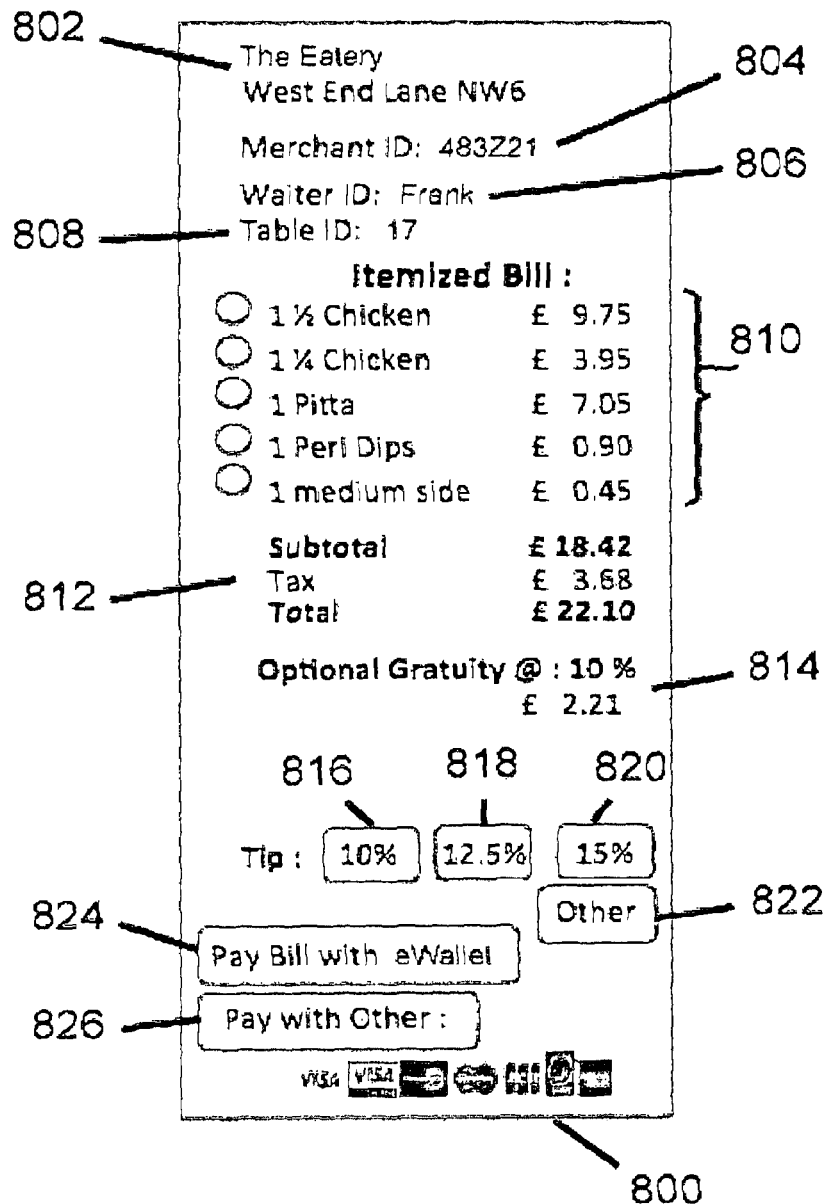
FIG. 8 illustrates an example display provided by a scanner application in accordance with an example embodiment.

The bill and the payment QR code can be provided, individually or in combination, to the diner. For example, the POS terminal 104 may print a hardcopy of the bill that contains the payment QR code, or may print the QR code separately to a hardcopy of the bill. At block 708, the user can use the scanner app 164 and the scanner 156 to scan the payment QR code on the hardcopy of the bill. At block 710, the scanner app 164 decodes the scanned payment QR code to recover the encoded data that it contains namely, the merchant identification code, the bill identification number and the bill details. At block 712, the scanner app 164 displays a page 800 on the user interface 154 with all the bill details, as illustrated in FIG. 8. At block 714 of FIG. 7 the user can review the bill details displayed on page 800 and amend the displayed data, if necessary. After reviewing and amending the data on page 800, the user can select, at block 716, a payment instrument to pay the bill. At block 718 the user can accept the bill for payment. The scanner app then transmits to the application server 102, at block 720, the merchant identification code, the bill identification number, the amount due and the details of a payment instrument to be used for payment (for example, a credit or debit card number, a cardholders name, a card expiry date, a CVC, or a PIN, as stored in the user profile 110). Once the details of the selected payment instrument have been received at the application server 102, the particulars of the financial transaction (for example, the bill amount, and merchant and payment details) are sent to a payment processor (not shown) for processing (at block 722).

At block 724, the application server 102 can determine whether the payment was successful. The payment processor transmits a payment status indicator, for example, either successful or unsuccessful. If the payment status is successful, the application server 102 notifies the scanner app 164, at block 726, that payment has been successful and the displayed page refreshes to indicate that the diner's bill has been paid (block 728). If, on the other hand, the payment status is unsuccessful, the application server 102 notifies the scanner app 164, at block 730, that payment has been unsuccessful and the page displayed by the scanner app 164 refreshes to request the user to select a different payment instrument and re-attempt payment (block 732).

At block 734, if the payment status indicator is successful, the application server 102 can transmit the bill identification number and the amount paid by the user to the merchant terminal 108 for processing. The merchant terminal 108 provides the received data to the merchant app 178, which uses the bill identification code to perform a lookup in the bill database 180 and retrieve the corresponding bill details (block 736). At block 738, the merchant app updates the bill details to include the amount paid by the user on that bill and to update the status of the bill as paid.

As illustrated in FIG. 8, the bill details displayed on page 800 of the user interface 154 of the code scanner 102 consist of the name and address 802 of the restaurant, the merchant identification code 804, a waiter identity or code 806, a table number 808, and a description and cost 810 of each item consumed during the meal, and tax due 812. The bill details can also include a service charge 814 that is automatically added to the amount due. Page 800 also includes icons 816, 818, 820 and 822 that provide the user with an option to add a service charge to the amount due on the bill if not already included in the bill total, or to alter the amount of a service charge if already included. Icons 816, 818 and 820 relate to predefined service charge amounts as a percentage of the bill total, for example, 10%, 12.5% and 15% respectively, while icon 822 relates to a free-form entry field for service charge amounts that are different to the predefined service charge amounts.

Page 800 also displays icons 824 and 826 that allow the user to select a payment instrument to use to pay the merchant's bill. Icon 824 can be used to select an c-wallet with which to pay, while icon 826 can be used to select a debit card or a credit card with which to pay the bill. If the user profile 110 in the code scanner 106 contains details of more than one payment instrument, the user can be prompted to select a preferred payment instrument from a drop-down list displayed in the scanner app 164.

IV. Example Operation B

Figure 9:
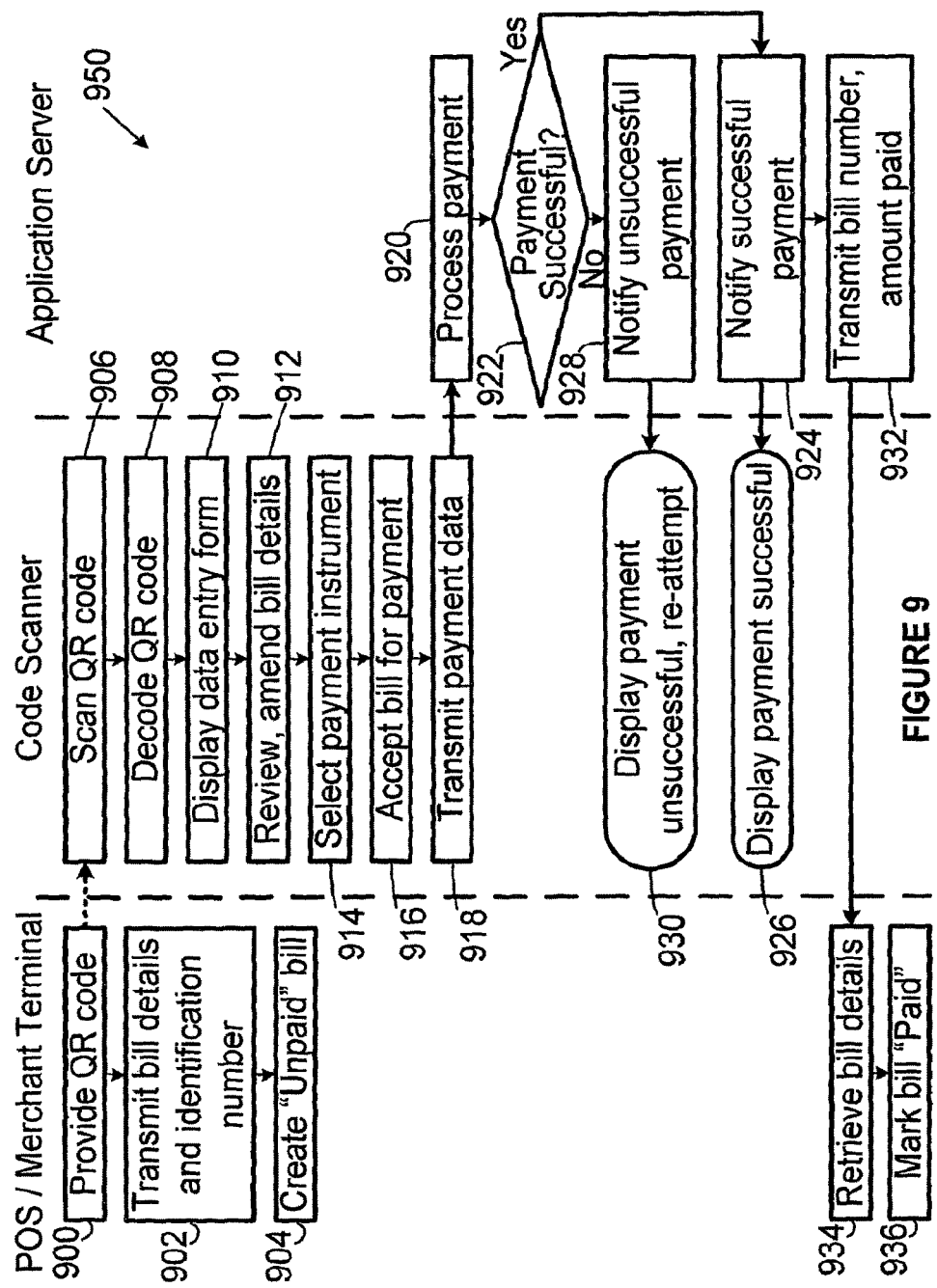
FIG. 9 is a flow chart of functions to carry out payment of a bill at a merchant establishment in accordance with a second embodiment of the system of FIG. 1.

FIG. 9 is a flow chart that depicts a set of functions 950 that can be carried out in accordance with an alternative embodiment. The set of functions 950 can be performed to pay the restaurant bill. The set of function 950 are shown within blocks 900 through 936. A description of those blocks now follows.

Upon completion of the meal the diner can request a bill for payment from a waiter. The waiter can draw up a bill that contains, for example, a name and address of the restaurant, a waiter identification, a table number, a description and a corresponding cost of each item consumed during the meal, any tax included in the bill, and a total amount due. At block 900 the POS terminal 104 can provide a payment QR code that encodes the merchant identification code 140 in the merchant profile 142 and a bill identification code or number. The payment QR code may be generated by the POS terminal 104 or may be served to the POS terminal by an external source of QR codes (not shown). At block 902, the POS terminal 104 transmits the bill details and the bill identification number to the merchant terminal 108 for further processing. The merchant app 178 appends the bill identification number and the bill details to the bills database 180 on the merchant terminal 108 and marks the status of the bill as pending (block 904).

The POS terminal 104 can provide a hardcopy of the bill that displays the bill details and the payment QR code. At block 906 the user can use the scanner app 164 and the scanner 156 to scan the payment QR code on the hardcopy of the bill. At block 908, the scanner app decodes the scanned payment QR code to recover the encoded data that it contains namely the merchant identification code and the bill identification number. At block 910, the scanner app 164 displays a page on the user interface 154 that contains the merchant identification code and a free-form entry field in which the user can enter the amount due on the bill.

At block 912 the user can review and amend the displayed amount, for example, by adding a service charge to the amount due on the bill, or by altering the amount of a service charge that is already included in the bill. The user can select, at block 914, a payment instrument to pay the bill. At block 916 the user can accept the bill for payment. The scanner app 164 then transmits to the application server 102, at block 918, the merchant identification code, the bill identification number, the amount due and the details of a payment instrument to be used for payment (for example, a credit or debit card number, a cardholder's name, a card expiry date, a CVC, or a PIN, as stored in the user profile 110). Once the details of the selected payment instrument have been received at the application server 102, the particulars of the financial transaction (for example, the amount due, and merchant and payment details) are sent to a payment processor (not shown) for processing (at block 920).

At block 922, the application server 102 can determine whether the payment was successful. The payment processor transmits a payment status indicator, for example, either successful or unsuccessful. If the payment status is successful, the application server 102 notifies the scanner app 164, at block 924, that payment has been successful and the displayed page refreshes to indicate that the diner's bill has been paid (block 926). If, on the other hand, the payment status is unsuccessful, the application server 102 notifies the scanner app 164, at block 928, that payment has been unsuccessful and page displayed by the scanner app 164 refreshes to request the user to select a different payment instrument and re-attempt payment (block 930).

At block 932, if the payment status indicator is successful, the application server 102 can transmit the bill identification number and the amount paid by the user to the merchant terminal 108 for processing. The merchant terminal 108 provides the received data to the merchant app 178, which uses the bill identification code to perform a lookup in the bill database 180 and retrieve the corresponding bill details (block 934). At block 936, the merchant app updates the bill details to include the amount paid by the user on that bill and updates the status of the bill as paid.

V. Example Operation C

Figure 10:
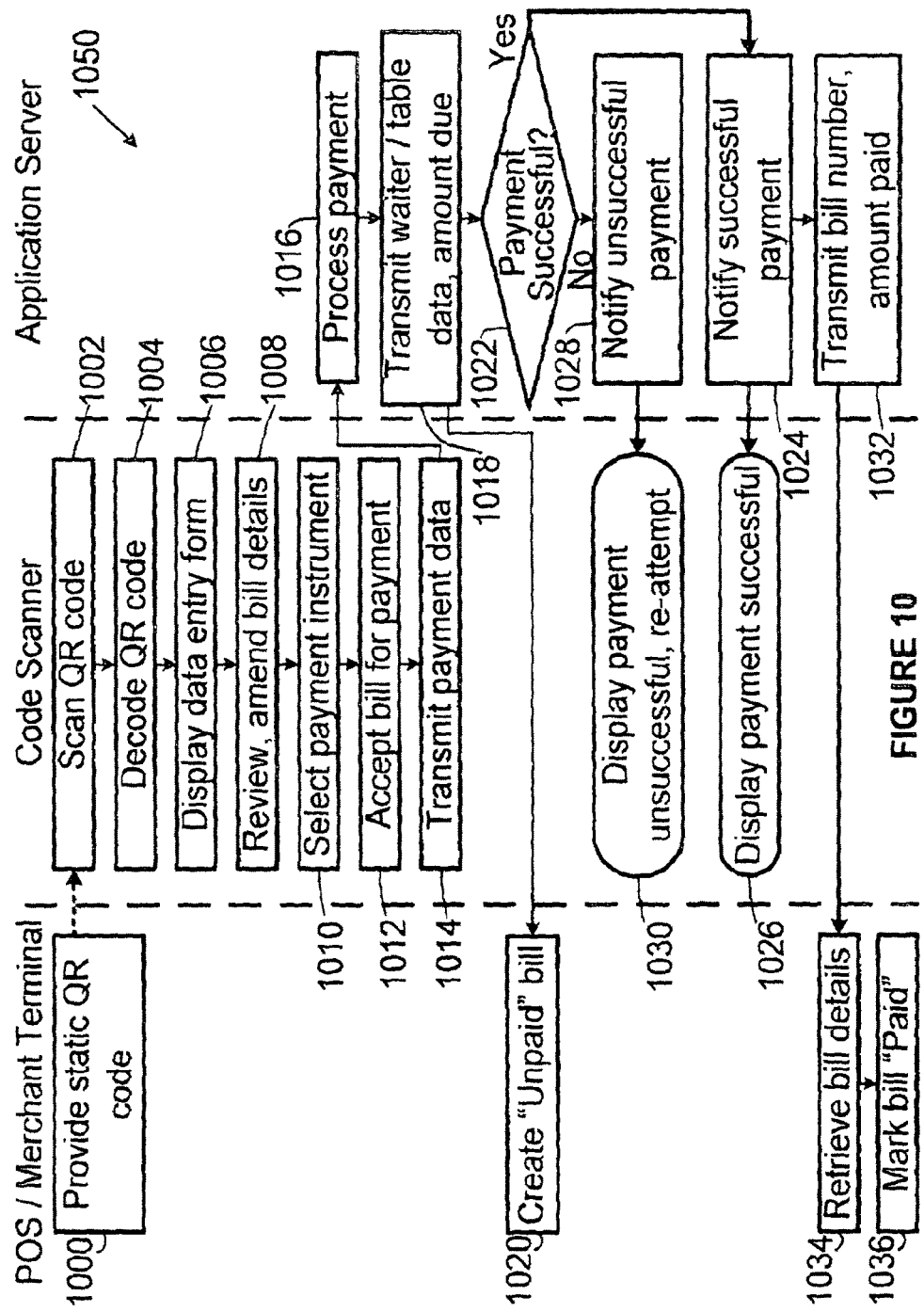
FIG. 10 is a flow chart of functions to carry out payment of a bill at a merchant establishment in accordance with a third embodiment of the system of FIG. 1.

FIG. 10 is a flow chart that depicts a set of functions 1050 that can be carried out in accordance with a further alternative embodiment. The set of functions 1050 can be performed to pay the restaurant bill. The set of functions 1050 are shown within blocks 1000 through 1036. A description of those blocks now follows.

Upon completion of the meal the diner can request a bill for payment from a waiter. The waiter can draw up a bill that contains, for example, a name and address of the restaurant, a waiter identification, a table number, a description and a corresponding cost of each item consumed during the meal, any tax included in the bill, and a total amount due. At block 1000 the merchant or waiter affixes a sticker bearing a payment QR code onto a hardcopy of the bill. The payment QR code is a static QR code and encodes the merchant identification code 140 in the merchant profile 142.

At block 1002, the user can use the scanner app 164 and the seamier 156 to scan the payment QR code on the hardcopy bill. At block 1004, the scanner app 164 decodes the scanned payment QR code to recover the encoded data that it contains namely, the merchant identification code. At block 1006, the scanner app 164 displays a page on the user interface 154 that contains the merchant identification code and a free-form entry field in which the user can enter the amount due on the bill, the waiter identification code and the table number.

At block 1008 the user can review and amend the displayed amount due, for example, by adding a service charge to the amount due on the bill, or by altering the amount of a service charge that is already included in the amount due. The user can select, at block 1010, a payment instrument to pay the bill. At block 1012 the user can accept the bill for payment. The scanner app 164 then transmits to the application server 102, at block 1014, the merchant identification code, the waiter identification and table number, the amount due and the details of the selected payment instrument to be used for payment. Once the details of the selected payment instrument have been received at the application server 102, the particulars of the financial transaction (for example, the amount due and the payment details) are sent to a payment processor (not shown) for processing (at block 1016). At block 1018 the application server 102 transmits the waiter identification and table number, as well as the amount due, to the merchant terminal 108 where the merchant app 178 appends the waiter identification/table number and amount due to the bills database 180 as a new bill and marks the status of the bill as pending (block 1020).

At block 1022, the application server 102 can determine whether the payment was successful. The payment processor returns a payment status indicator, for example, either successful or unsuccessful. If the payment status is successful, the application server 102 notifies the scanner app 164, at block 1024, that payment has been successful and the displayed page refreshes to indicate that the diner's bill has been paid (block 1026). If, on the other hand, the payment status is unsuccessful, the application server 102 notifies the scanner app 164, at block 1028, that payment has been unsuccessful and the page displayed by the scanner 164 refreshes to request the user to select a different payment instrument and re-attempt payment (block 1030).

At block 1032, if the payment status indicator is successful, the application server 102 can transmit the waiter identification/table number and the amount paid by the user to the merchant terminal 108 for processing. The merchant terminal 108 provides the received data to the merchant app 178, which uses the waiter identification/table number to perform a lookup in the bill database 180 and retrieve the corresponding bill details (block 1034). At block 1036 the merchant app updates the bill details to include the amount paid by the user on that bill and updates the status of the bill as paid.

VI. Example Operation D

Figure 11:
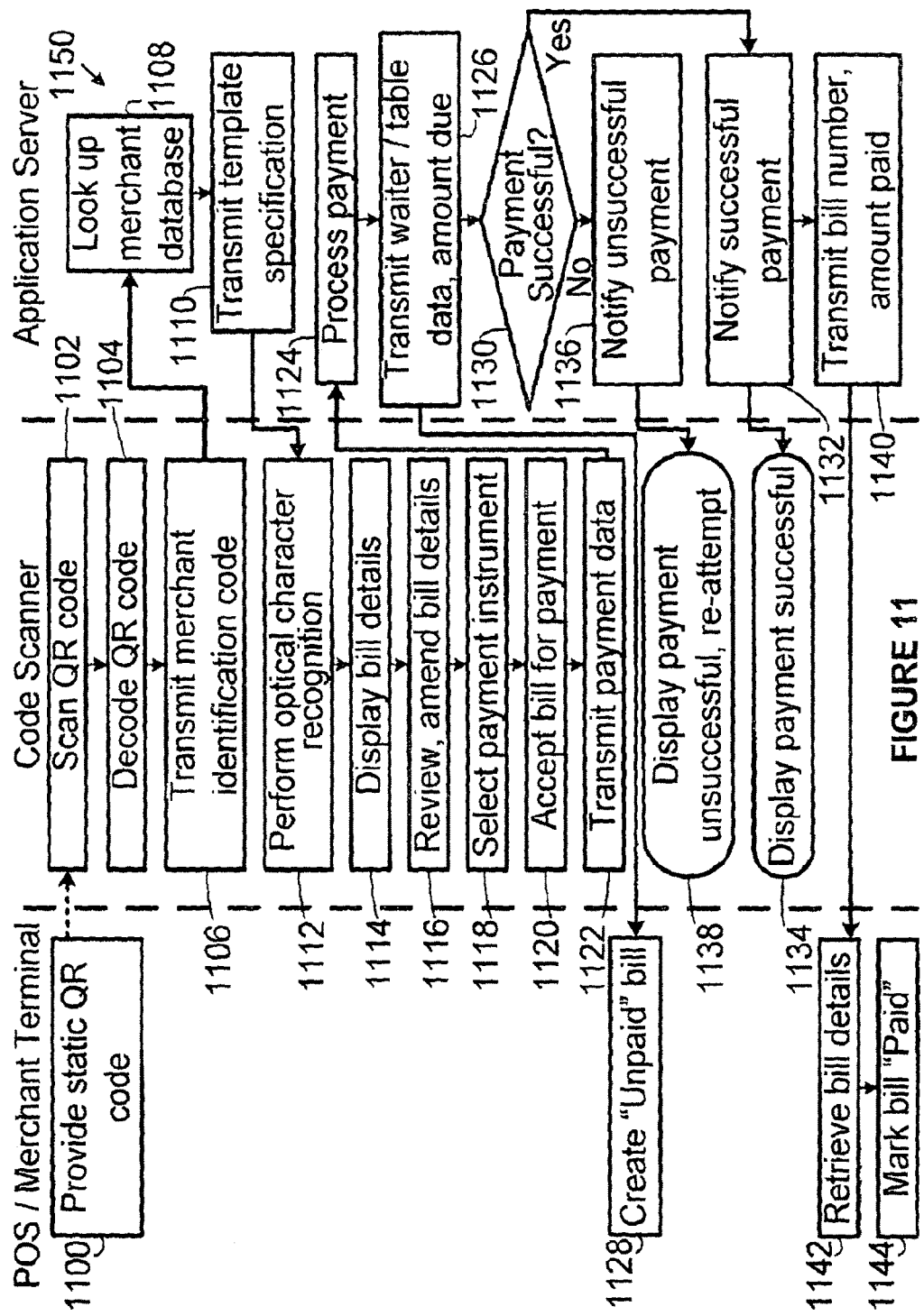
FIG. 11 is a flow chart of functions to carry out payment of a bill at a merchant establishment in accordance with a fourth embodiment of the system of FIG. 4.

FIG. 11 is a flow chart that depicts a set of functions 1150 that can be carried out in accordance with a further alternative embodiment. The set of functions 1150 can be performed to pay the restaurant bill. The set of functions 1150 are shown within blocks 1100 through 1138. A description of those blocks now follows.

In this embodiment the merchant portal website 120 enables a merchant to define a template specification (not shown) of the bill layout that is used by the merchant's business. In particular, the template defines the areas on the merchant's hardcopy bill where the different bill attributes are located, for example, the merchant identification code, bill identification number, amount due, waiter identification, table number and the like. The template specification is stored in the merchant's profile 142 in the merchant database 112.

Furthermore, in this embodiment, the scanner app 164 and the scanner 156 can perform optical character recognition from an image.

Upon completion of the meal the diner can request a bill for payment from a waiter. The waiter can draw up a bill that contains, for example, a name and address of the restaurant, a waiter identification, a table number, a description and a corresponding cost of each item consumed during the meal, any tax included in the bill, and a total amount due. At block 1100 the waiter or merchant affixes a sticker bearing a payment QR code onto a hardcopy of the bill. The payment QR code is a static QR code that encodes only the merchant identification code 140 in the merchant profile 142.

At block 1102, the user can use the scanner app 164 and the scanner 156 to scan the QR code and to take an image of the entire hardcopy bill. At block 1104, the scanner app 164 decodes the scanned payment QR code to recover the encoded data that it contains namely, the merchant identification code. At block 1106 the scanner app 164 transmits the merchant identification code to the application server 102 and requests the template specification of the merchant's hardcopy bill. At block 1108, the application server 102 uses the merchant identification code to perform a lookup in the merchant profile in the merchant database 112. At block 1110, the application server 102 transmits the template specification to the code scanner 106. The code scanner 106 provides the template specification to the scanner app 164 which then performs optical character recognition on the image of the hardcopy bill in accordance with the template specification (block 1112). The optical character recognition results in the recovery of the waiter identification, table number and the amount due from the image of the bill.

At block 1114 the scanner app 164 displays a page on the user interface 150 that contains the merchant identification code, the amount due on the bill, the waiter identification and the table number. At block 1116 the user can review and amend the displayed amount due, for example, by adding a service charge to the amount due on the bill, or by altering the amount of a service charge that is already included in the amount due. The user can select, at block 1118, a payment instrument to pay the bill. At block 1120 the user can accept the bill for payment. The scanner app 164 then transmits to the application server 102, at block 1122, the merchant identification code, the waiter identification and table number, the amount due and the details of the selected payment instrument to be used for payment. Once the details of the selected payment instrument have been received at the application server 102, the particulars of the financial transaction (for example, the amount due and the payment details) are sent to a payment processor (not shown) for processing (at block 1124). At block 1126 the application server 102 transmits the waiter identification and table number, as well as the amount due, to the merchant terminal 108 where the merchant app 178 appends the waiter identification/table number and amount due to the bills database 180 as a new bill and marks the status of the bill as pending (block 1128).

At block 1130, the application server 102 can determine whether the payment was successful. The payment processor returns a payment status indicator, for example, either successful or unsuccessful. If the payment status is successful, the application server 102 notifies the scanner app 164, at block 1132, that payment has been successful and the displayed page refreshes to indicate that the diner's bill has been paid (block 1134). If, on the other hand, the payment status is unsuccessful, the application server 102 notifies the scanner app 164, at block 1136, that payment has been unsuccessful and the page displayed by the scanner 164 refreshes to request the user to select a different payment instrument and re-attempt payment (block 1138).

At block 1140, if the payment status indicator is successful, the application server 102 can transmit the waiter identification/table number and the amount paid by the user to the merchant terminal 108 for processing. The merchant terminal 108 provides the received data to the merchant app 178, which uses the waiter identification/table number to perform a lookup in the bill database 180 and retrieve the corresponding bill details (block 1142). At block 1144 the merchant app updates the bill details to include the amount paid by the user on that bill and updates the status of the bill as paid.

Clearly, numerous variations and permutations are possible to the embodiments without departing from the scope of this disclosure: Some of these variations and permutations are described below.

1. In accordance with one or more of the disclosed embodiments, the restaurant bill and the payment QR code can be presented to the user directly on an electronic display, for example an electronic display on the POS terminal 104, instead of in hardcopy form. The user can then scan the payment QR code directly from the electronic display in order to pay the bill. The POS terminal 104 can transmit the bill identification code and the bill details directly to the merchant terminal 108 for further processing, without requiring the merchant to scan the payment QR code by means of the merchant app 178 and the scanner 171 on the merchant terminal.

2. In accordance with one or more of the disclosed embodiments, instead of the user profile 110 being stored only on the code scanner 106, the profile can be replicated and stored on the application server 102 as well. In this embodiment, the scanner app 164 on the code scanner 106 synchronises changes to the user profile 110 with the copy of the profile on the application server 102 as the changes occur, or periodically, or explicitly under user command. The copy of the user profile on the application server 102 can then be imported to a different code scanner, for example when the user changes smartphones or in the event the user loses or damages her code scanner 106.

3. In accordance with one or more of the disclosed embodiments, in order to improve security of the system 100, transmission of data from the user profile 110 to the application server 102 by the scanner app 164 can be encrypted.

4. In accordance with one or more of the disclosed embodiments, instead of the application server 102 sending the particulars of the financial transaction (for example, the amount due and the payment details) to a payment processor (not shown) for processing, the application server 102 can process the payment itself.

5. In accordance with one or more of the disclosed embodiments, the scanner app 164 on the code scanner 106 and the merchant app 178 on the merchant terminal 108 can be the same application that has two modes of operation, namely user and merchant modes, respectively. The application that executes on the code scanner 106 can operate in user mode by default while a merchant that has registered on the merchant portal website 120 and created a merchant profile in the merchant database 112 can configure the application that executes on the merchant terminal 108 to operate in merchant mode.

Figure 12:
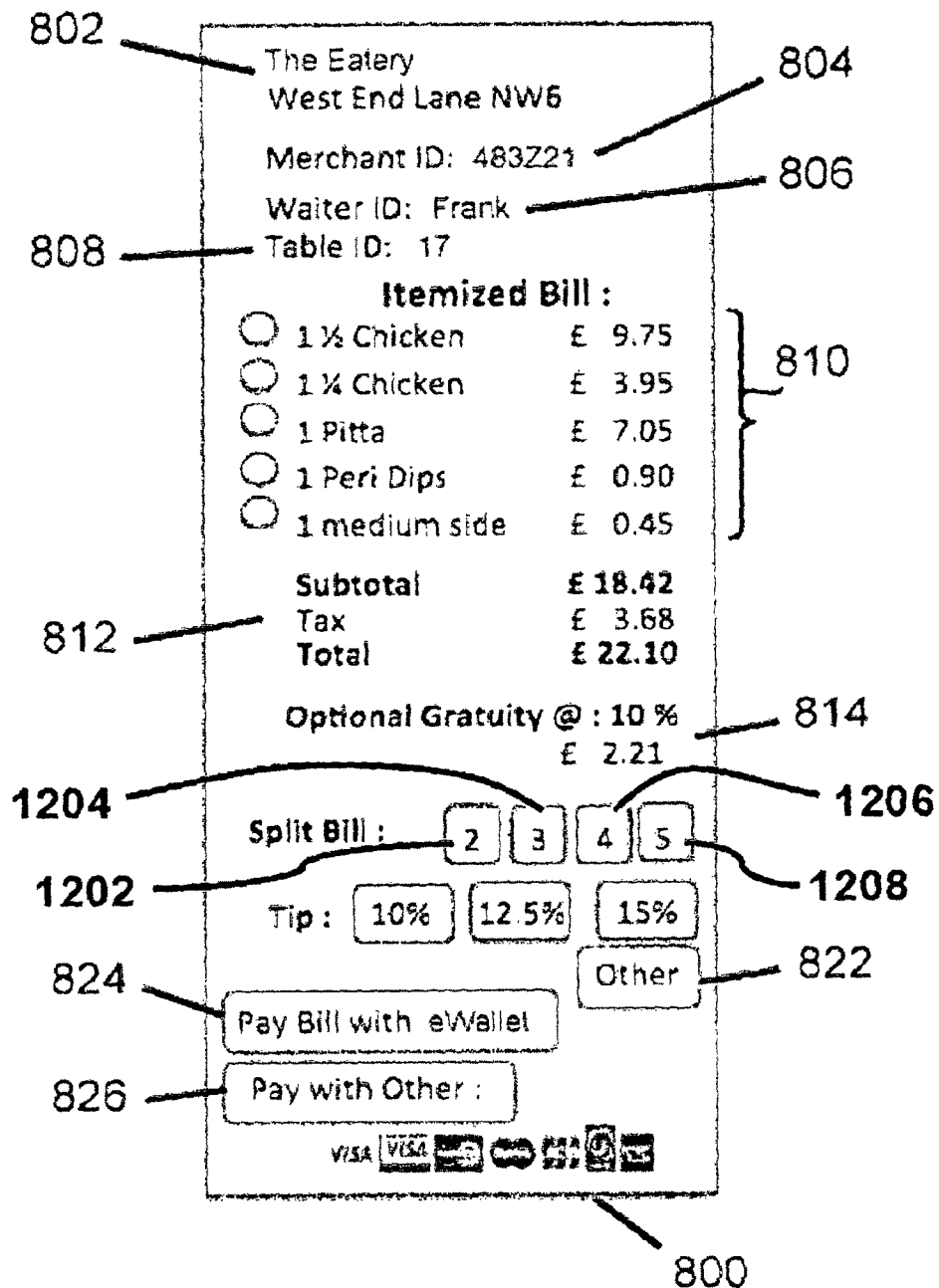
FIG. 12 illustrates a further example display provided by the scanner application in accordance with an example embodiment.

6. In accordance with one or more of the disclosed embodiments, as illustrated in FIG. 12, the bill details displayed on the user interface 154 of the code seamier 102 can also include icons 1202, 1204, 1206 and 1208 that provide the user with an option to split payment of the bill with fellow diners. Icons 1204, 1204, 1206 and 1208 correspond to splitting the bill 2, 3, 4 or 5 ways, respectively. In order to split the bill, the user activates one of the icons 1202, 1204, 1206 and 1208 as desired and the display on the user interface refreshes to show the total amount due (inclusive of any service charge) and a subtotal due for each of the diners that are to share payment. For example, if the user activates icon 1206 to split the bill four ways, the displayed page will show four subtotals due. The page includes an icon that the user can activate to split the total amount due equally between the diners that will pay, in which case the seamier app updates the subtotals due to show equal amounts. In addition, the page can include controls (for example, slider icons) to adjust each of the subtotals due, subject to the constraint that the sum of the subtotals due is equivalent to the total amount due. In order to pay the bill, each diner that is to share payment is required to pay that diner's subtotal due.

The use of Quick Response technology (QR codes), as described in the example embodiments, can enable user interactions in connection with bill payment at a merchant establishment to be conducted more efficiently than is possible by means of known prior art methods. Once a user has established a user profile 110, the user need only scan, by means of the code scanner 106, a QR code displayed on a merchant bill website in order to effect payment of the bill. The user is spared the tedium of having to tender cash or a physical payment instrument such as a credit or debit card for payment. It is anticipated that the use of QR codes for bill payment in this manner will reduce the tedium of bill payment.

Data in the user profile 110 is stored locally in the code scanner 106. This means that sensitive user data such as particulars of payment instruments like credit or debit cards need not be handed over to other persons such as, for example, a waiter or a merchant, thus reducing the possibility of such particulars being misappropriated.

VII. Additional Example Embodiments

The following clauses are offered as further description of the disclosed inventions.

Clause 1—A method comprising:
scanning, using a code scanner, a quick response (QR) code that encodes a merchant identification code that identifies a merchant;
decoding, using the code scanner, the QR code to recover the merchant identification code;
displaying, on the code scanner, information pertaining to a bill from the merchant;
selecting, using the code scanner, a first payment instrument for paying the bill, and authorizing the bill for payment;
transmitting from the code scanner to an application server the merchant identification code, data pertaining to an amount due on the bill, and data pertaining to the first payment instrument; and
receiving, at the code scanner from the application server, status data indicating whether the bill was successfully or unsuccessfully paid.

Clause 2—The method of clause 1, further comprising:
generating the QR code at a point of sale terminal.

Clause 3—The method of clause 1, further comprising:
receiving the QR code at a point of sale terminal.

Clause 4—The method of any of clauses 1 through 3, further comprising:
printing, at a point of sale terminal, a hardcopy of the QR code.

Clause 5—The method of clause 4,
wherein the hardcopy of the QR code is printed with a hardcopy of the bill.

Clause 6—The method of any of clauses 1 through 5, wherein the bill and the QR code are displayed on a point of sale terminal, and wherein scanning the QR code further comprises:
scanning the QR code from an electronic display on the point of sale terminal.

Clause 7—The method of any of clauses 1 through 6, wherein the QR code further encodes a bill identification code that identifies the bill, and wherein decoding the QR code further recovers the bill identification code.

Clause 8—The method of any of clauses 1 through 7, wherein the QR code further encodes data pertaining to details of the bill, and wherein decoding the QR code further recovers data pertaining to details of the bill.

Clause 9—The method of any of clauses 1 through 8, wherein the QR code further encodes (i) a bill identification code that identifies the bill and (ii) data pertaining to details of the bill, and wherein decoding the QR code further recovers the bill identification code and data pertaining to details of the bill.

Clause 10—The method of any of clauses 1 through 9, further comprising:
entering, on the code scanner, data pertaining to the amount due on the bill.

Clause 11—The method of any of clauses 1 through 10, further comprising:
entering, on the code scanner, data pertaining to the amount due on the bill, data pertaining to a waiter identification, and data pertaining to a table number.

Clause 12—The method of any of clauses 1 through 11, further comprising:
displaying, on the code scanner, data pertaining to the amount due on the bill, data pertaining to a waiter identification, and data pertaining to a table number.

Clause 13—The method of any of clauses 1 through 5, 7, and 12, wherein the code scanner further scans an image of the bill, and further comprising:
transmitting, from the code scanner to the application server, the merchant identification code, and requesting from the application server a template specification of bills for the merchant;
receiving, at the code scanner from the application server, the template specification of bills for the merchant; and
at the code scanner, performing optical character recognition on the image of the bill to recover data pertaining to a waiter identification, data pertaining to a table number, and data pertaining to the amount due on the bill.

Clause 14—The method of any of clauses 1 through 13, further comprising:
modifying, on the code scanner, information pertaining to the bill.

Clause 15—The method of clause 14, further comprising:
adding, on the code scanner, a tip to the bill.

Clause 16—The method of any of clauses 1 through 15, further comprising:
transmitting, from the application server to a payment processor, data pertaining to an amount due on the bill and data pertaining to the first payment instrument; and receiving, at the application server from the payment processor, status data indicating whether the bill was successfully or unsuccessfully paid.

Clause 17—The method of clause 16, wherein the application server also transmits to the payment processor data pertaining to the merchant identification code.

Clause 18—The method of any of clauses 1 through 17, further comprising:

displaying, on the code scanner, an indication that the bill has been paid.

Clause 19—The method of any of clauses 1 through 17, further comprising:

displaying, on the code scanner, an indication that the bill has not been successfully paid;

selecting, using the code scanner, a second payment instrument for paying the bill, and authorizing the bill for payment; and transmitting, from the code scanner to an application server, data pertaining to the second payment instrument.

Clause 20—The method of any of clauses 1 through 19, further comprising:

scanning, using a merchant terminal, the QR code that further encodes (i) a bill identification code that identifies the bill and (ii) data pertaining to details of the bill;

decoding, using the merchant terminal, the QR code to recover the bill identification code and data pertaining to details of the bill; and provisioning a bills database with the bill identification code and data pertaining to details of the bill, and identifying a status of the bill as unpaid.

Clause 21—The method of any of clauses 1 through 19, further comprising:

transmitting, from a point of sale terminal to a merchant terminal, (i) a bill identification code that identifies the bill and (ii) data pertaining to details of the bill; and provisioning a bills database with the bill identification code and the data pertaining to details of the bill, and identifying a status of the bill as unpaid.

Clause 22—The method of any of clauses 1 through 21, further comprising:

transmitting, from the application server to the merchant terminal, data pertaining to the amount due on the bill, data pertaining to a waiter identification, and data pertaining to a table number; and provisioning a bills database with the data pertaining to the amount due on the bill, the data pertaining to the waiter identification, and the data pertaining to a table number, and identifying a status of the bill as unpaid.

Clause 23—The method of any of clauses 1 through 22, further comprising:

transmitting, from the application server to a merchant terminal, data pertaining to an amount paid of the bill; and provisioning a bills database with the amount paid of the bill and an indication that the bill has been paid.

Clause 24—The method of clause 23, wherein the application server also transmits a bill identification code to the merchant terminal.

Clause 25—The method of any of clauses 23 through 24, wherein the application server also transmits data pertaining to a waiter identification and data pertaining to a table number to the merchant terminal.

Clause 26—The method of any of clauses 23 through 25, further comprising:

the merchant terminal updating the bills database with data pertaining to an amount paid of the bill and an indication that the bill has been paid.

Clause 27—The method of any of clauses 1 through 26, further comprising: selecting, using the code scanner, one of a plurality of divisors by which to split the bill.

Clause 28—The method of any of clauses 1 through 27, further comprising:

before selecting the first payment instrument for paying the bill, storing data pertaining to the first payment instrument in a user profile accessible by the code scanner.

Clause 29—A code scanner device comprising:

a processor; and a computer-readable data storage device comprising program instructions executable by the processor to carry out a method of any one of clauses 1 through 28.

Clause 30—A computer-readable data storage device comprising computer-readable program instructions executable by a processor to carry out a method of any one of clauses 1 through 28.

Clause 31—The computer-readable data storage device of clause 30, wherein the computer-readable data storage device is a non-transitory computer-readable data storage device.

Clause 32—A computer data signal embodied in a carrier wave, the computer data signal comprising computer-readable program instructions for performing a method of any one of clauses 1 through 28.

Clause 33—A reproducible computer-readable signal carrying computer-readable program instructions for performing a method of any one of clauses 1 through 28.

Clause 34—A computer software product for registering a user of a data processing system with a merchant server, the software product comprising instructions, that when executed by a processor of the data processing system will cause the data processing system to carry out the functions of any one of clauses 1 through 28.

Clause 35—A code scanner device comprising:

a processor;

a scanner configured to scan a quick response (QR) code that encodes a merchant identification code that identifies a merchant;

a non-transitory computer-readable data storage device comprising computer-readable program instructions, wherein the program instructions are executable by the processor to decode the QR code;

a user interface configured to display bill information and to allow a user to select a first payment instrument for paying the bill and to authorize a bill for payment; and a network interface;

wherein the network interface is configured to transmit, to an application server, the merchant identification code, data pertaining to an amount due on the bill, and data pertaining to the first payment instrument; and wherein the network interface is configured to receive, from the application server, status data indicating whether the initial attempt of paying the bill was successful or unsuccessful.

Clause 36—The code scanner of clause 35, wherein the user interface is configured to receive the data pertaining to the amount due on the bill.

Clause 37—The code scanner of any of clauses 35 through 36, wherein the user interface is configured to receive data modifying an amount due on the bill.

Clause 38—The code scanner of any of clauses 35 through 37, wherein the user interface is configured to receive data adding a tip to the bill.

Clause 39—The code scanner of any of clauses 35 through 38,
wherein the user interface is configured to receive a selection of one of a plurality of divisors by which to divide the bill.

Clause 40—The code scanner of any of clauses 35 through 39,
wherein the computer-readable program instructions are executable by the processor to store data pertaining to the first payment instrument in a user profile accessible by the code scanner.

Clause 41—The code scanner of any of clauses 35 and 37 through 40,
wherein the scanner is configured to scan an image of the bill;
wherein the network interface is configured to transmit, to the application server, the merchant identification code and to request, from the application server, a template specification of bills for the merchant;
wherein the network interface is configured to receive, from the application server, the template specification of bills for the merchant; and
wherein the computer-readable program instructions are executable by the processor to perform optical character recognition on the image of the bill to recover data pertaining to a waiter identification, data pertaining to a table number, and data pertaining to the amount due on the bill.

Clause 42—A method comprising:
receiving, at an application server from a first code scanner, a merchant identification code that identifies a merchant, wherein the merchant identification code was derived from a quick response (QR) code associated with a bill from the merchant;
receiving, at the application server from the first code scanner, data pertaining to an amount due on the bill;
receiving, at the application server from the first code scanner, data pertaining to a first payment instrument selected for a first attempt of paying the bill;
determining, at the application server, whether processing the data pertaining to the amount due on the bill and the data pertaining to the first payment instrument results in successful or unsuccessful payment of the bill; and
transmitting, from the application server to the first code scanner, first status data indicating whether the attempt of paying the bill was successful or unsuccessful.

Clause 43—The method of clause 42, further comprising:
storing, within a data storage device of the application server, a user-profile associated with a user of the first code scanner;
receiving, at the application server, a request to transmit the user-profile to a second code scanner; and
transmitting the user-profile from the application server to the second code scanner.

Clause 44—The method of clause 43,
wherein user-profile comprises security data for authorizing transmission of the user-profile from the application server to a code scanner; and
wherein the request to transmit the user-profile comprises the security data and the application server determines the security data in the request matches the security data in the user-profile prior to transmitting the user-profile to the second code scanner.

Clause 45—The method of any of clauses 42 through 44, further comprising:
transmitting the data pertaining to the amount due on the bill and the data pertaining to the first payment instrument to a payment processor; and
wherein processing the data pertaining to the amount due on the bill and the data pertaining to the first payment instrument occurs at the payment processor.

Clause 46—The method of clause 45,
wherein the payment processor is remote from the application server.

Clause 47—The method of clause 45,
wherein the payment processor is within the application server.

Clause 48—The method of clause 45, further comprising:
transmitting the data pertaining to the merchant identification code to the payment processor.

Clause 49—The method of any of clauses 42 through 48, further comprising:
receiving, at the application server from the first code scanner, data pertaining to a second payment instrument selected for a second attempt of paying the bill;
determining, at the application server, whether processing the data pertaining to the second payment instrument results in successful or unsuccessful payment of the bill; and
transmitting, from the application server to the first code scanner, second status data indicating whether the second attempt of paying the bill was successful or unsuccessful.

Clause 50—The method of any of clauses 42 through 49, further comprising:
transmitting, from the application server to a merchant terminal, the bill identification code and data pertaining to an amount paid of the bill; and
providing a bills database with the amount paid of the bill and an indication that the bill has been paid.

Clause 51—The method of any of clauses 42 through 50, further comprising:
transmitting, from the application server to the first code scanner, a scanner application for decoding the QR code on the bill; and
wherein the merchant identification code is encoded within the QR code on the bill.

Clause 52—A server device comprising:
a processor; and
a computer-readable data storage device comprising program instructions executable by the processor to carry out a method of any one of clauses 42 through 51.

Clause 53—A computer-readable data storage device comprising computer-readable program instructions executable by a processor to carry out a method of any one of clauses 42 through 51.

Clause 54—The computer-readable data storage device of clause 53, wherein the computer-readable data storage device is a non-transitory computer-readable data storage device.

Clause 55—A computer data signal embodied in a carrier wave, the computer data signal comprising computer-readable program instructions for performing a method of any one of clauses 42 through 51.

Clause 56—A reproducible computer-readable signal carrying computer-readable program instructions for performing a method of any one of clauses 42 through 51.

Clause 57—A computer software product for registering a user of a data processing system with a merchant server, the software product comprising instructions, that when executed by a processor of the data processing system will cause the data processing system to carry out the functions of any one of clauses 42 through 51.

Clause 58—An application server system comprising:
a processor;
a non-transitory computer-readable data storage device comprising computer-readable program instructions; and a network interface configured to receive, from a first code scanner, (i) a merchant identification code that identifies a merchant, wherein the merchant identification code was derived from a quick response (QR) code associated with a bill from the merchant, (ii) data pertaining to an amount due on the bill, and (iii) data pertaining to a first payment instrument selected for an attempt of paying the bill; and wherein the program instructions are executable by the processor to determine whether processing the data pertaining to the amount due on the bill and the data pertaining to the first payment instrument results in successful or unsuccessful payment of the bill;

wherein the program instructions are executable by the processor to cause the network interface to transmit first status data to the first code scanner; and wherein the first status data indicates whether the attempt of paying the bill was successful or unsuccessful.

Clause 59—A method comprising:

receiving, at a merchant terminal, (i) a bill identification code that identifies a bill from a merchant and (ii) data pertaining to details of the bill, wherein the bill identification code and data pertaining to details of the bill are encoded in a quick response (QR) code associated with the bill; and provisioning a bills database with the bill identification code and data pertaining to details of the bill, and identifying a status of the bill as unpaid.

Clause 60—The method of clause 59, wherein receiving, at a merchant terminal, (i) a bill identification code that identifies a bill and (ii) data pertaining to details of the bill, comprises:

scanning, at the merchant terminal, the QR code that encodes (i) the bill identification code that identifies the bill and (ii) the data pertaining to details of the bill; and decoding, using the merchant terminal, the QR code to recover the bill identification code and the data pertaining to details of the bill.

Clause 61—The method of any of clauses 59 through 60, further comprising:

transmitting, from an application server to the merchant terminal, data pertaining to an amount paid of the bill; and provisioning the bills database with the amount paid of the bill and an indication that the bill has been paid.

Clause 62—The method of clause 61, further comprising:

transmitting from the application server to the merchant terminal the bill identification code.

Clause 63—The method of any of clauses 61 through 62, further comprising:

transmitting from the application server to the merchant terminal data pertaining to a waiter identification and data pertaining to a table number.

Clause 64—A merchant terminal device comprising:

a processor; and a computer-readable data storage device comprising program instructions executable by the processor to carry out a method of any one of clauses 59 through 63.

Clause 65—A computer-readable data storage device comprising computer-readable program instructions executable by a processor to carry out a method of any one of clauses 59 through 63.

Clause 66—The computer-readable data storage device of clause 65, wherein the computer-readable data storage device is a non-transitory computer-readable data storage device.

Clause 67—A computer data signal embodied in a carrier wave, the computer data signal comprising computer-readable program instructions for performing a method of any one of clauses 59 through 63.

Clause 68—A reproducible computer-readable signal carrying computer-readable program instructions for performing a method of any one of clauses 59 through 63.

Clause 69—A computer software product for registering a user of a data processing system with a merchant server, the software product comprising instructions, that when executed by a processor of the data processing system will cause the data processing system to carry out the functions of any one of clauses 59 through 63.

Clause 70—A merchant terminal device comprising:

a processor;

a non-transitory computer-readable data storage device comprising computer-readable program instructions; and a network interface;

wherein the network interface is configured to receive (i) a bill identification code that identifies a bill from a merchant and (ii) data pertaining to details of the bill, wherein the bill identification code and data pertaining to details of the bill are encoded in a quick response (QR) code associated with the bill; and wherein the program instructions are executable by the processor to provision a bills database with the bill identification code and the data pertaining to details of the bill, and an identification of a status of the bill as unpaid.

Clause 71—The merchant terminal of clause 70, further comprising:

a scanner configured to scan the QR code that encodes (i) the bill identification code that identifies the bill and (ii) data pertaining to details of the bill; and wherein the program instructions are executable by the processor to decode the QR code to recover the bill identification code and data pertaining to details of the bill.

Clause 72—The merchant terminal of any of clauses 70 through 71, wherein the network interface is configured to receive, from an application server, data pertaining to an amount paid of the bill; and wherein the program instructions are executable by the processor to provision the bills database with data pertaining to the amount paid of the bill and an indication that the bill has been paid.

Clause 73—The merchant terminal of clause 72, wherein the network interface is configured to receive, from the application server, the bill identification code.

Clause 74—A method comprising:

providing, at a point of sale terminal, a bill from a merchant; and providing, at the point of sale terminal, a quick response (QR) code that encodes a merchant identification code that identifies the merchant.

Clause 75—The method of clause 74, wherein the QR code further encodes a bill identification code and data pertaining to details of the bill.

Clause 76—The method of any of clauses 74 through 75, further comprising:

generating the QR code at the point of sale terminal.

Clause 77—The method of any of clauses 74 through 76, further comprising:

printing the QR code at the point of sale terminal.

Clause 78—The method of any of clauses 74 through 77, further comprising:

printing the bill and the QR code at the point of sale terminal.

Clause 79—The method of any of clauses 74 through 78, further comprising:

transmitting, from the point of sale terminal to a merchant terminal, data pertaining to details of the bill and a bill identification code that identifies the bill.

Clause 80—A point of sale terminal device comprising:
a processor; and
a computer-readable data storage device comprising program instructions executable by the processor to carry out a method of any one of clauses 74 through 79.

Clause 81—A computer-readable data storage device comprising computer-readable program instructions executable by a processor to carry out a method of any one of clauses 74 through 79.

Clause 82—The computer-readable data storage device of clause 81, wherein the computer-readable data storage device is a non-transitory computer-readable data storage device.

Clause 83—A computer data signal embodied in a carrier wave, the computer data signal comprising computer-readable program instructions for performing a method of any one of clauses 74 through 79.

Clause 84—A reproducible computer-readable signal carrying computer-readable program instructions for performing a method of any one of clauses 74 through 79.

Clause 85—A computer software product for registering a user of a data processing system with a merchant server, the software product comprising instructions, that when executed by a processor of the data processing system will cause the data processing system to carry out the functions of any one of clauses 74 through 79.

Clause 86—A point of sale terminal device comprising:
a processor;
a non-transitory computer-readable data storage device comprising computer-readable program instructions; and
a network interface; and
wherein the program instructions are executable by the processor to provide a bill from a merchant and a quick response (QR) code that encodes a merchant identification code that identifies the merchant.

Clause 87—The point of sale terminal of clause 86,
wherein the network interface is configured to transmit, to a merchant terminal, data pertaining to details of the bill and a bill identification code that identifies the bill.

Clause 88—A method carried out by a data processing system for transferring funds from a first party with a first party device to a second party with a second party device, using a financial server which has a first party wallet for storing funds of the first party and a second party wallet for storing funds of the second party, wherein there is generated a unique identifier for a transaction in which funds will be transferred from the first party to the second party; using the unique identifier the first party authorises the financial server to transfer funds stored in the first party wallet to the second party; the financial server transfers funds from the first party wallet to the second party wallet in accordance with the authorisation received from the first party; and the financial server notifies the second party that the transaction has taken place.

Clause 89—The method of clause 88, wherein the first party is a client and the second party is a merchant and the financial transaction is for the client to pay a bill from the merchant, the method comprising the following steps carried out on the first party device:
scanning an encoding of the bill;
in response to scanning the encoding of the bill, transmitting the encoding of the bill to the financial server;
receiving, from the financial server, content of the bill, wherein the content of the bill includes at least an itemized list of purchases;
in response to receiving the content of the bill, prompting selection of a service charge from a list of service charges;
receiving a selected service charge enumerated in the list of service charges; and
in response to receiving the selected service charge, adding the selected service charge to the bill and transmitting authorization, to the financial server, to transfer a total amount from the first party wallet to the second party wallet, wherein the total amount includes charges associated with the itemized list of purchases and the selected service charge.

VIII. Conclusion

Example embodiments have been described above. Those skilled in the art will understand that changes and modifications can be made to the described embodiments without departing from the true scope and spirit of the present invention, which is defined by the claims.

This detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be used, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including in substantially concurrent or in reverse order, depending on the functionality involved. Further, more or fewer steps, blocks and/or functions can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer-readable medium such as a storage device including a disk or hard drive or other storage media.

The computer-readable medium can include non-transitory computer-readable media such as computer-readable media that stores data for short periods of time like register memory, processor cache, and/or random access memory (RAM). The computer-readable media can include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media can be any other volatile or non-volatile storage systems. A computer-readable medium can be considered a computer-readable storage medium, for example, or a tangible storage device. Software for use in carrying out the invention can also be in transitory form, for example in the form of signals transmitted over a network such as the Internet.

Moreover, a step or block that represents one or more information transmissions can correspond to information transmissions between software and/or hardware modules in the same physical device. However, other information transmissions can be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting.

The invention claimed is:

1. A method performed by a mobile wireless communication device, the method comprising:
scanning, via a scanner of the mobile wireless communication device, a non-textual image that encodes a merchant identification code corresponding to (i) a merchant and (ii) a merchant template;
decoding the non-textual image to recover the merchant identification code;
sending, to an application server, a request for a template corresponding to the merchant, wherein the request includes the merchant identification code recovered from decoding the non-textual image;
capturing an image of text of a bill from the merchant;
receiving, from the application server, the merchant template, wherein the merchant template associates (i) a bill identification code data field with a first location within the image of text and (ii) an amount due data field with a second location within the image of text;
performing optical character recognition to identify the text of the bill;
using the merchant template to determine (i) that a first portion of the text that appears at the first location is a bill identification code and (ii) that a second portion of the text that appears at the second location is an amount due; and
sending, to the application server, the bill identification code, the amount due, and information identifying a payment instrument, thereby initiating payment of the amount due by the payment instrument.

2. The method of claim 1, wherein the non-textual image is a quick response (QR) code.

3. The method of claim 1, wherein scanning the non-textual image comprises scanning a non-textual image generated by a point of sale terminal.

4. The method of claim 1, further comprising:
receiving, from the application server, data indicating whether the bill was successfully paid using the payment instrument.

5. The method of claim 4, further comprising:
receiving input indicating the payment instrument,
wherein sending the information identifying the payment instrument comprises sending information identifying the payment instrument indicated by the received input.

6. A non-transitory computer readable medium storing instructions that, when executed by a mobile wireless communication device, cause the mobile wireless communication device to perform functions comprising:
scanning, via a scanner of the mobile wireless communication device, a non-textual image that encodes a merchant identification code corresponding to (i) a merchant and (ii) a merchant template;
decoding the non-textual image to recover the merchant identification code;
sending, to an application server, a request for a template corresponding to the merchant, wherein the request includes the merchant identification code recovered from decoding the non-textual image;
capturing an image of text of a bill from the merchant;
receiving, from the application server, the merchant template, wherein the merchant template associates (i) a bill identification code data field with a first location within the image of text and (ii) an amount due data field with a second location within the image of text;
performing optical character recognition to identify the text of the bill;
using the merchant template to determine (i) that a first portion of the text that appears at the first location is a bill identification code and (ii) that a second portion of the text that appears at the second location is an amount due; and
sending, to the application server, the bill identification code, the amount due, and information identifying a payment instrument, thereby initiating payment of the amount due by the payment instrument.

7. The non-transitory computer readable medium of claim 6, wherein the non-textual image is a quick response (QR) code.

8. The non-transitory computer readable medium of claim 6, wherein scanning the non-textual image comprises scanning a non-textual image generated by a point of sale terminal.

9. The non-transitory computer readable medium of claim 6, the functions further comprising:
receiving, from the application server, data indicating whether the bill was successfully paid using the payment instrument.

10. The non-transitory computer readable medium of claim 9, the functions further comprising:
receiving input indicating the payment instrument,
wherein sending the information identifying the payment instrument comprises sending information identifying the payment instrument indicated by the received input.

11. A mobile wireless communication device comprising:
a processor; and
a non-transitory computer readable medium storing instructions that, when executed by the processor, cause the mobile wireless communication device to perform functions comprising:
scanning, via a scanner of the mobile wireless communication device, a non-textual image that encodes a merchant identification code corresponding to (i) a merchant and (ii) a merchant template;
decoding the non-textual image to recover the merchant identification code;

sending, to an application server, a request for a template corresponding to the merchant, wherein the request includes the merchant identification code recovered from decoding the non-textual image;

capturing an image of text of a bill from the merchant;

receiving, from the application server, the merchant template, wherein the merchant template associates (i) a bill identification code data field with a first location within the image of text and (ii) an amount due data field with a second location within the image of text;

performing optical character recognition to identify the text of the bill;

using the merchant template to determine (i) that a first portion of the text that appears at the first location is a bill identification code and (ii) that a second portion of the text that appears at the second location is an amount due; and sending, to the application server, the bill identification code, the amount due, and information identifying a payment instrument, thereby initiating payment of the amount due by the payment instrument.

12. The mobile wireless communication device of claim 11, wherein the non-textual image is a quick response (QR) code.

13. The mobile wireless communication device of claim 11, wherein scanning the non-textual image comprises scanning a non-textual image generated by a point of sale terminal.

14. The mobile wireless communication device of claim 11, the functions further comprising:

receiving, from the application server, data indicating whether the bill was successfully paid using the payment instrument.

15. The mobile wireless communication device of claim 14, the functions further comprising:

receiving input indicating the payment instrument, wherein sending the information identifying the payment instrument comprises sending information identifying the payment instrument indicated by the received input.

16. The method of claim 1, wherein the merchant template associates (iii) a waiter identification code data field with a third location within the image of text, the method further comprising:

using the merchant template to determine (iii) that a third portion of the text that appears at the third location is a waiter identification code; and sending, to the application server, the waiter identification code.

17. The method of claim 1, wherein the merchant template associates (iii) a table number data field with a fourth location within the image of text, the method further comprising:

using the merchant template to determine (iii) that a fourth portion of the text that appears at the fourth location is a table number; and sending, to the application server, the table number.

18. The non-transitory computer readable medium of claim 6, wherein the merchant template associates (iii) a waiter identification code data field with a third location within the image of text, the functions further comprising:

using the merchant template to determine (iii) that a third portion of the text that appears at the third location is a waiter identification code; and sending, to the application server, the waiter identification code.

19. The non-transitory computer readable medium of claim 6, wherein the merchant template associates (iii) a table number data field with a fourth location within the image of text, the functions further comprising:

using the merchant template to determine (iii) that a fourth portion of the text that appears at the fourth location is a table number; and sending, to the application server, the table number.

20. The mobile wireless communication device of claim 11, wherein the merchant template associates (iii) a waiter identification code data field with a third location within the image of text, the functions further comprising:

using the merchant template to determine (iii) that a third portion of the text that appears at the third location is a waiter identification code; and sending, to the application server, the waiter identification code.

* * * * *